(12) United States Patent
Kanazawa

(10) Patent No.: US 11,390,252 B2
(45) Date of Patent: Jul. 19, 2022

(54) WIPER BLADE AND VEHICLE WIPER DEVICE

(71) Applicant: DENSO CORPORATION, Kariya (JP)

(72) Inventor: Keisuke Kanazawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 16/701,225

(22) Filed: Dec. 3, 2019

(65) Prior Publication Data

US 2021/0070255 A1 Mar. 11, 2021

(30) Foreign Application Priority Data

Sep. 9, 2019 (JP) .............................. JP2019-163663

(51) Int. Cl.
*B60S 1/32* (2006.01)
*B60S 1/08* (2006.01)
*B60S 1/38* (2006.01)

(52) U.S. Cl.
CPC ............... *B60S 1/32* (2013.01); *B60S 1/0822* (2013.01); *B60S 2001/3812* (2013.01)

(58) Field of Classification Search
CPC .... B60S 1/3801; B60S 1/3411; B60S 1/0822; B60S 2001/3817; B60S 2001/3812; B60S 1/32; B60S 1/08; B60S 1/38; B60S 1/3824; B60S 1/3884

USPC ...................................................... 15/250.001
See application file for complete search history.

(56) References Cited

U.S. PATENT DOCUMENTS

2010/0125967 A1* 5/2010 Lieven ...................... B60S 1/04
15/250.202
2011/0219563 A1* 9/2011 Guastella .............. B60S 1/3801
15/250.351

FOREIGN PATENT DOCUMENTS

JP 5940926 B2 6/2016

* cited by examiner

*Primary Examiner* — Katina N. Henson
(74) *Attorney, Agent, or Firm* — Oliff PLC

(57) ABSTRACT

A wiper blade wipes a wiping surface. The wiper blade includes a blade rubber that is disposed in contact with the wiping surface, a wiper case that holds the blade rubber, and a state changing member that is accommodated in the wiper case and rotatable in the wiper case. The state changing member is rotatable in the wiper case or movable in a longitudinal direction. The state changing member is configured to change a curved form or rigidity in the longitudinal direction of the wiper blade in accordance with a curved form of the wiping surface when a rotational position or a longitudinal position of the state changing member is changed.

13 Claims, 17 Drawing Sheets

WIPER BLADE AND VEHICLE WIPER DEVICE

BACKGROUND

1. Field

The present disclosure relates to a wiper blade and a vehicle wiper device.

2. Description of Related Art

In a wiper blade of a vehicle wiper device that wipes an outer surface (wiping surface) of a windshield of a vehicle, a wiper case holds a blade rubber that is disposed in contact with the wiping surface. The wiper case accommodates a backing together with the blade rubber. The backing is formed from leaf spring material that has the same size as the blade rubber, obtains rigidity in the wiping direction, and applies pressing force to the wiping surface. The wiper is configured to have a reduced height from the wiping surface (e.g., refer to Japanese Patent No. 5940926).

Windshields of recent vehicles are often designed with extremely large curves included at the side ends near the pillars and parts other than the side ends also including curves.

With a wiper blade that wipes such a windshield, when merely using a backing having a larger curvature than that of the curved form of the conventional wiping surface, the blade rubber cannot consistently contact the wiping surface of which curved form greatly varies over the entire wiping range. Thus, there is a need to further improve the curve following characteristics.

SUMMARY

One object of the present disclosure is to provide a wiper blade and a vehicle wiper device that further improves the curve following characteristics with respect to a wiping surface and further improves the wiping capability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the above object, a wiper blade in accordance with a first aspect of the present disclosure wipes a wiping surface. The wiper blade includes a blade rubber that is disposed in contact with the wiping surface, a wiper case that holds the blade rubber, and a state changing member that is accommodated in the wiper case. The state changing member is rotatable in the wiper case or movable in a longitudinal direction. The state changing member is configured to change a curved form or rigidity in the longitudinal direction of the wiper blade in accordance with a curved form of the wiping surface when a rotational position or a longitudinal position of the state changing member is changed.

A wiper blade in accordance with a second aspect of the present disclosure wipes a wiping surface. The wiper blade includes a blade rubber that is disposed in contact with the wiping surface, a first backing that is formed from leaf spring material and applies pressing force directed toward the wiping surface to the blade rubber, a wiper case that holds the blade rubber and accommodates the first backing next to the blade rubber, and a second backing accommodated in the wiper case next to the first backing. The second backing is rotatable in the wiper case. The second backing is configured to change a curved form or rigidity in a longitudinal direction of the wiper blade in accordance with a curved form of the wiping surface when a rotational position of the second backing is changed.

A vehicle wiper device in accordance with a third aspect of the present disclosure includes the wiper blade in accordance with the second aspect, a wiper arm including a distal end portion to which the wiper blade is attached, a wiper motor that pivots the wiper arm back and forth so that the wiper blade produces a wiping action, an electric driving device that changes a rotational position of the second backing of the wiper blade, and a control circuit that controls and drives the wiper motor and the electric driving device. The control circuit is configured to change the rotational position of the second backing with the electric driving device during the wiping action of the wiper blade.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A wiper blade and a wiper blade device in accordance with a first embodiment will now be described.

Figure 1:
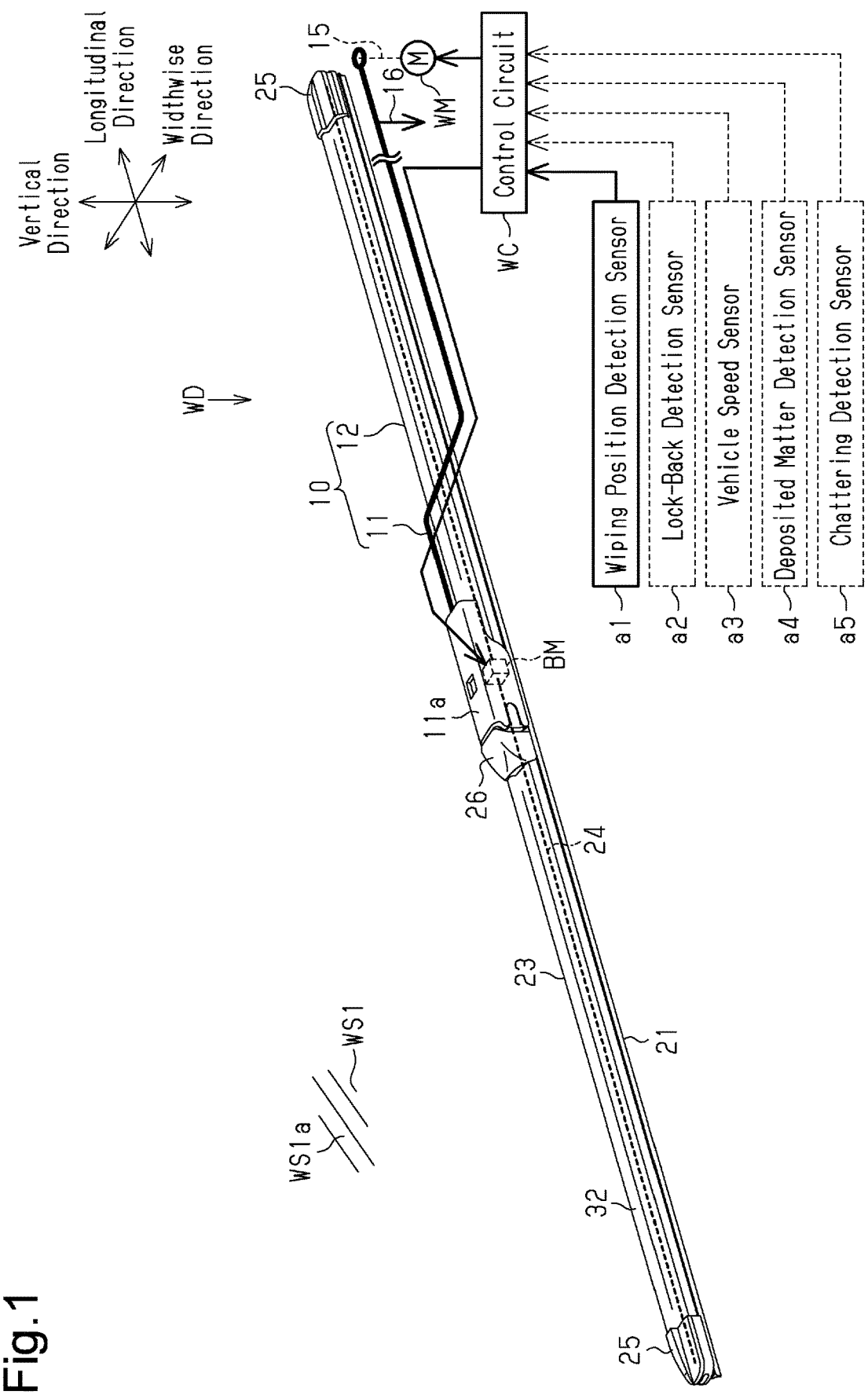
FIG. 1 is a diagram of a vehicle wiper device including a wiper blade in accordance with a first embodiment.

FIG. 1 shows a vehicle wiper device WD that wipes off foreign matter such as raindrops from an outer surface (wiping surface WS1a) of a windshield WS1 at a front side of a vehicle. The vehicle wiper device WD includes a wiper 10, a wiper motor WM, and a control circuit WC.

The wiper 10 includes a wiper arm 11 and a wiper blade 12. The wiper arm 11 includes a proximal end fixed to a pivot shaft 15 that is driven by the wiper motor WM and pivoted back and forth. The wiper blade 12 is attached in a removable manner to the distal end of the wiper arm 11. The wiper blade 12 is pressed by an urging mechanism 16 of the wiper arm 11 to press and contact the wiping surface WS1a of the windshield WS1. When the control circuit WC controls and drives the wiper motor WM to pivot the wiper arm 11 back and forth, the wiper blade 12 swings back and forth on the wiping surface WS1a of the windshield WS1 to produce a wiping action on the wiping surface WS1a.

The wiper blade 12 includes an elongated blade rubber 21 that is arranged in contact with the wiping surface WS1a, main backings 22 (refer to FIGS. 2 and 3) that serve as a pair of first backings formed by leaf spring material having generally the same length as the blade rubber 21, and a wiper case 23 that holds the blade rubber 21 and accommodates the main backings 22 next to each other. Further, the wiper blade 12 of the present embodiment accommodates a sub-backing 24 in the wiper case 23 between the main backings 22 in the widthwise direction. The sub-backing serves as a second backing formed by wire spring material having generally the same length as the blade rubber 21 (main backings 22). Further, the wiper blade 12 includes a backing moving motor BM serving as an electric driving device that changes a rotational position of the sub-backing 24. An end cap 25 is attached to each of the two longitudinal ends of the wiper case 23. A holder 26 is coupled to the main backings 22 and arranged on the longitudinally central part of the wiper case 23. A distal end coupling portion 11a of the wiper arm 11 is coupled to the holder 26. The distal end coupling portion 11a of the wiper arm 11 is generally C-shaped and has an open lower side (portion opposed to wiper blade 12). It is desirable that the backing moving motor BM be disposed in the distal end coupling portion 11a so as not to be exposed to the outside.

Figure 2:
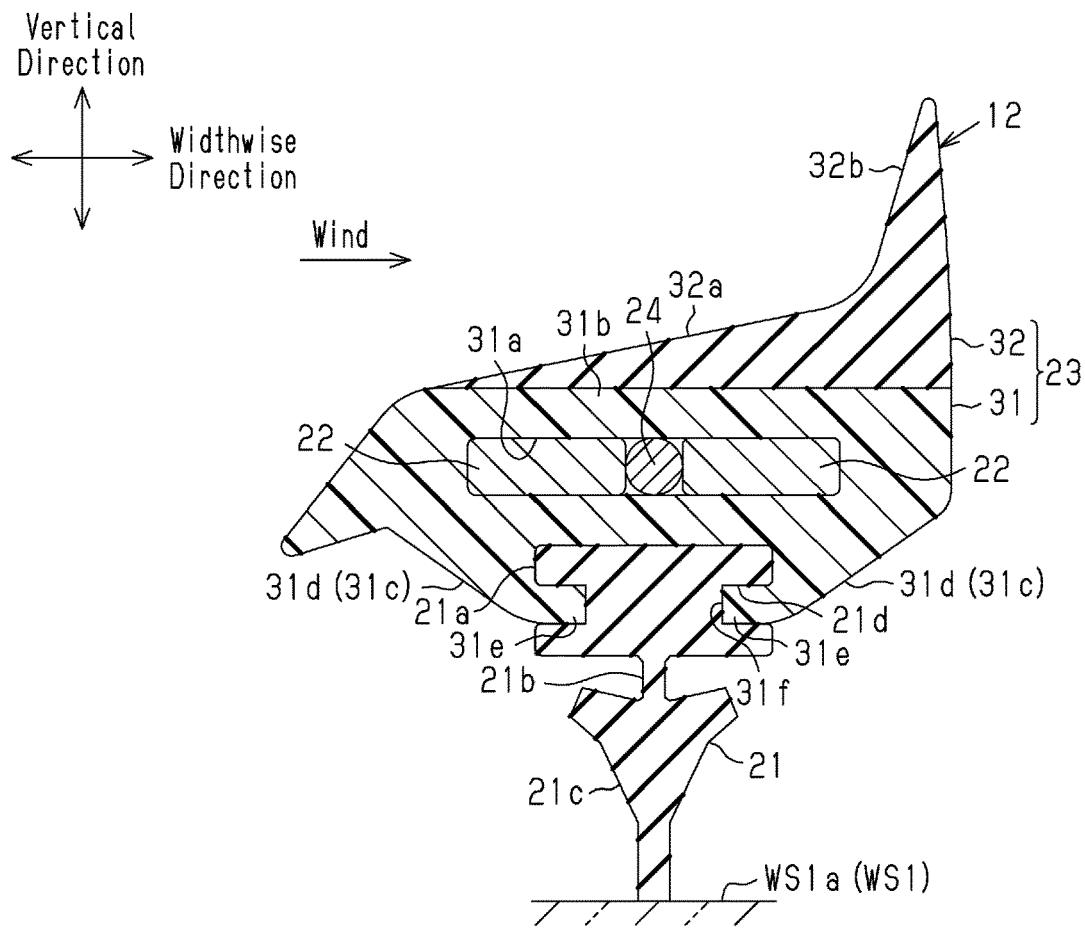
FIG. 2 is a widthwise direction cross-sectional view of the wiper blade in accordance with the first embodiment.

In a cross-section orthogonal to the longitudinal direction (widthwise cross-section) illustrated in FIG. 2, when the portion of the blade rubber 21 that is close to the wiping surface WS1a is referred to as a lower portion and the portion of the blade rubber 21 that is far from the wiping surface WS1a is referred to as an upper portion, the blade rubber 21 includes, from the upper portion toward the lower portion, a head portion 21a, a neck portion 21b, and a wiping portion 21c, each of which extends continuously in the longitudinal direction and has a cross-sectional form that is generally uniform in the longitudinal direction. The head portion 21a is block-like and its two side surfaces each include a claw insertion groove 21d into which a claw 31e, which will be described later, can be inserted. The claw insertion grooves 21d are paired in the widthwise direction of the wiper case 23. The claw insertion grooves 21d extend continuously in the longitudinal direction in the head portion 21a. The neck portion 21b is narrow and located between the head portion 21a and the wiping portion 21c. The wiping portion 21c has the form of a generally reversed triangle and is tiltable with respect to the head portion 21a to which the wiping portion 21c is connected by the neck portion 21b.

In a state in which the blade rubber 21 is attached to the wiper case 23 with the claws 31e inserted in the claw insertion grooves 21d, part of the lower side of the head portion 21a, the neck portion 21b, and the wiping portion 21c are exposed from the lower portion of the wiper case 23. The blade rubber 21 wipes the wiping surface WS1a as the lower end of the wiping portion 21c contacts the wiping surface WS1a and the wiping action of the wiper blade 12 tilts the wiping portion 21c.

Figure 3:
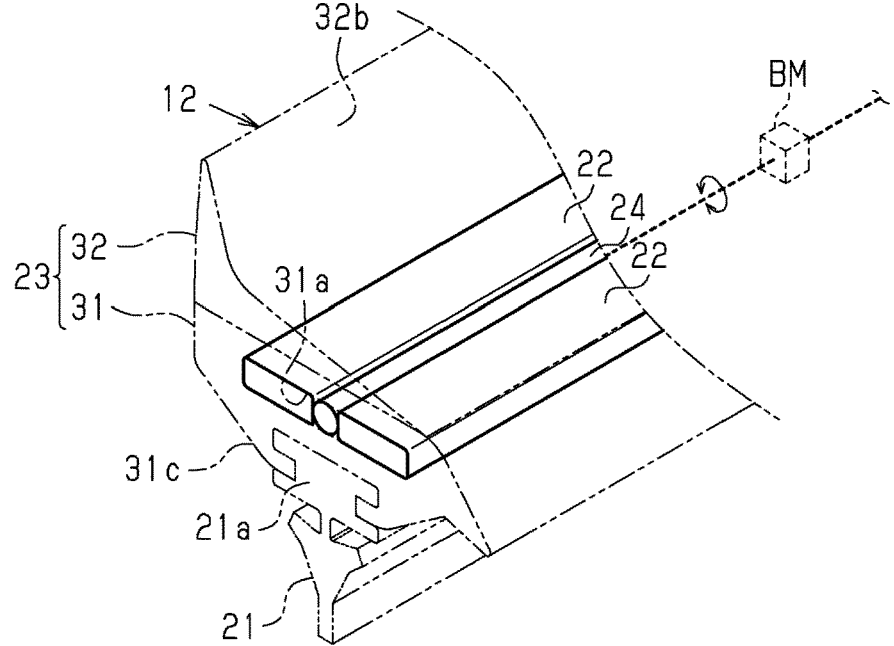
FIG. 3 is a perspective view of the wiper blade in accordance with the first embodiment.

As shown in FIGS. 2 and 3, the main backings 22 are flat and elongated (narrow) so as to have a rectangular form in a cross-section orthogonal to the longitudinal direction. Further, the main backings 22 are formed by metal leaf spring material having have spring characteristics (flexibility) in the thickness-wise direction. The present embodiment uses two main backings 22 that have the same structure. Each main backing 22 has generally the same longitudinal length as the blade rubber 21 in the longitudinal direction and is attached to the wiper case 23 so that its thickness-wise direction corresponds to the vertical direction. Each main backing 22 is located at the upper side of the blade rubber 21. Further, the main backings 22 are arranged next to each other on the same plane and spaced apart in the widthwise direction (direction generally parallel to wiping surface WS1a) with the widthwise direction of each main backing 22 extending in the same direction. The main backings 22 are arranged next to each other and spaced apart in the widthwise direction so as to allow the sub-backing 24 to be arranged in between. The main backings 22 including the sub-backing 24 in the widthwise direction are wider than the blade rubber 21.

The sub-backing 24 is formed by metal wire material having a circular form in a cross section orthogonal to the longitudinal direction and spring characteristics (flexibility) in all radial directions. The sub-backing 24 has generally the same longitudinal length as the main backings 22 (blade rubber 21) in the longitudinal direction and a diameter that is generally the same as the thickness of the main backings 22. The sub-backing 24 is disposed between the two main backings 22 and arranged next to the main backings 22 on the same plane. In the present embodiment, the center of the sub-backing 24 located between the main backings 22 is disposed to coincide with the center of the blade rubber 21 in the widthwise direction.

Figure 4:
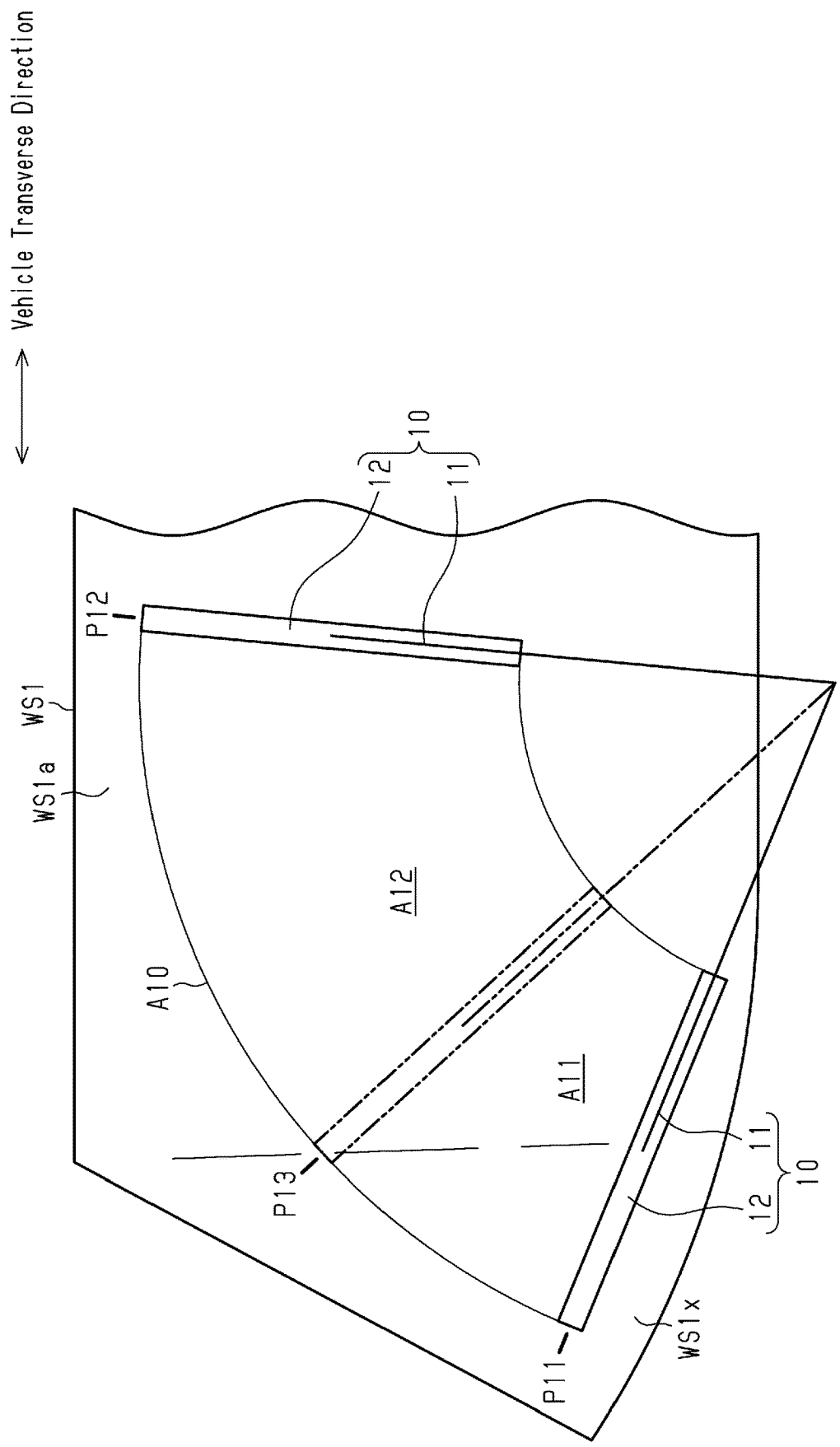
FIG. 4 is a diagram illustrating a wiping mode of the wiper blade in accordance with the first embodiment.

As shown in FIG. 4, the wiper blade 12 of the present embodiment may be used to wipe a wiping range A10 including a side end portion WS1x of the windshield WS1 at the front side of the vehicle. With the wiping range A10 including the side end portion WS1x of the windshield WS1, the distal end portion of the wiper blade 12 particularly wipes the wiping surface WS1a where a change in the curved shape is large.

More specifically, in a lower wiping range A11 including a lower reversing position P11, the distal end portion of the wiper blade 12 wipes a portion where the curvature of the wiping surface WS1a is large, and other portions such as a central portion and a proximal end portion of the wiper blade 12 wipes portions where the curvature of the wiping surface WS1a is small. In an upper wiping range A12 including an upper reversing position P12, the entire wiper blade 12 in the longitudinal direction wipes the wiping surface WS1a. In the present embodiment, the portion where the curving degree of the wiping surface WS1a starts to greatly vary toward the lower reversing position P11 (or stops varying toward the upper reversing position P12) reached by the distal end portion of the wiper blade 12 is referred to as a border position P13. The lower wiping range A11 extends from the border position P13 to the lower reversing position P11, and the upper wiping range A12 extends from the border position P13 to the upper reversing position P12. The control circuit WC detects the position of the wiper blade 12 with a wiping position detection sensor a1 and recognizes the positions P11, P13, and P12 and the winding ranges A11 and A12.

In accordance with the wiping mode of the wiper blade 12 (mode of contact with wiping surface WS1a), among the main backings 22 and the sub-backing 24, the main backings 22 are configured to be curved and bulged upward entirely in the longitudinal direction over the entire wiping range A10. In other words, the main backings 22 are set to have a generally uniform curved form in the longitudinal direction and do not have any special directivity.

Figure 5:
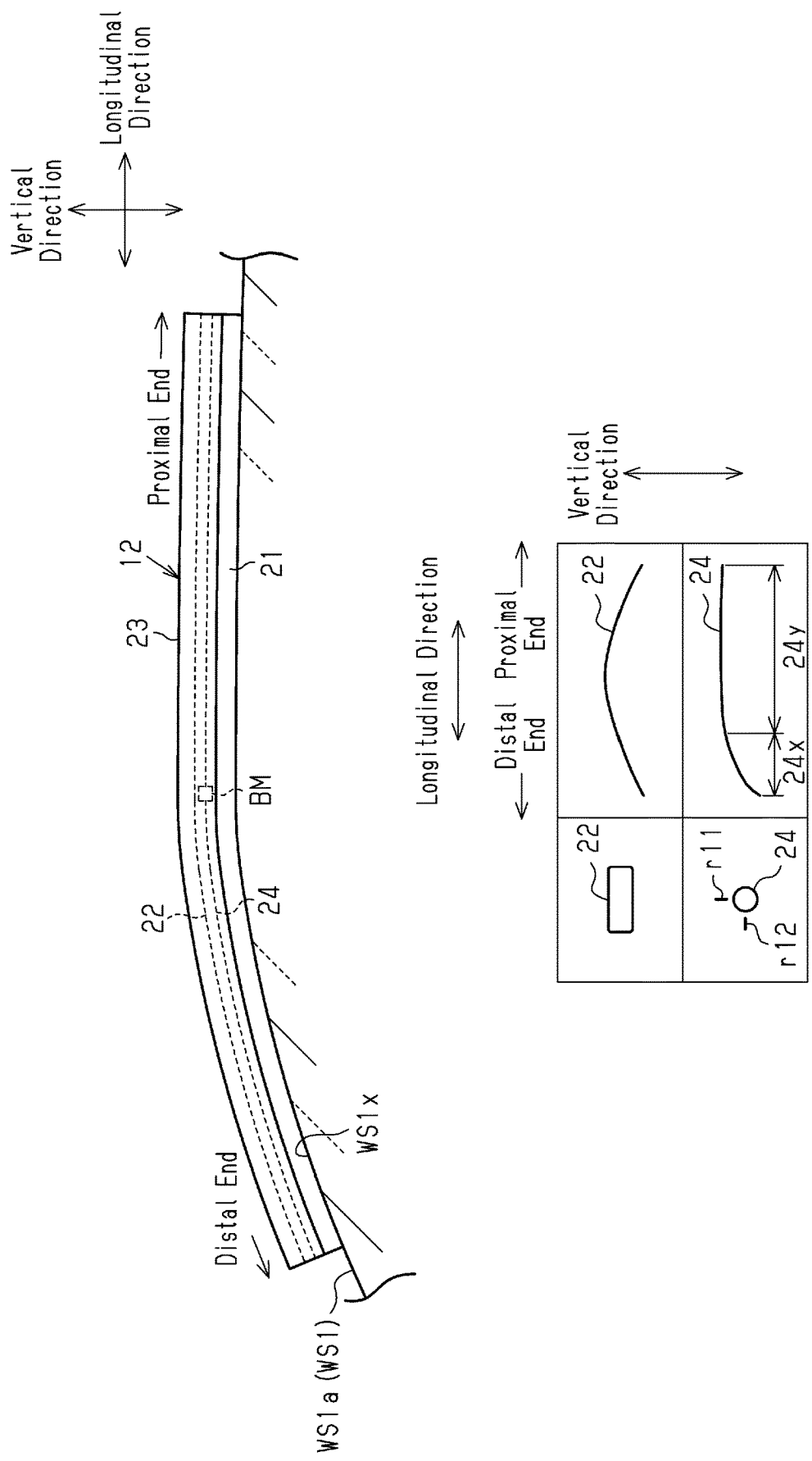
FIG. 5 is a diagram illustrating a wiping mode of the wiper blade in accordance with the first embodiment.
Figure 6:
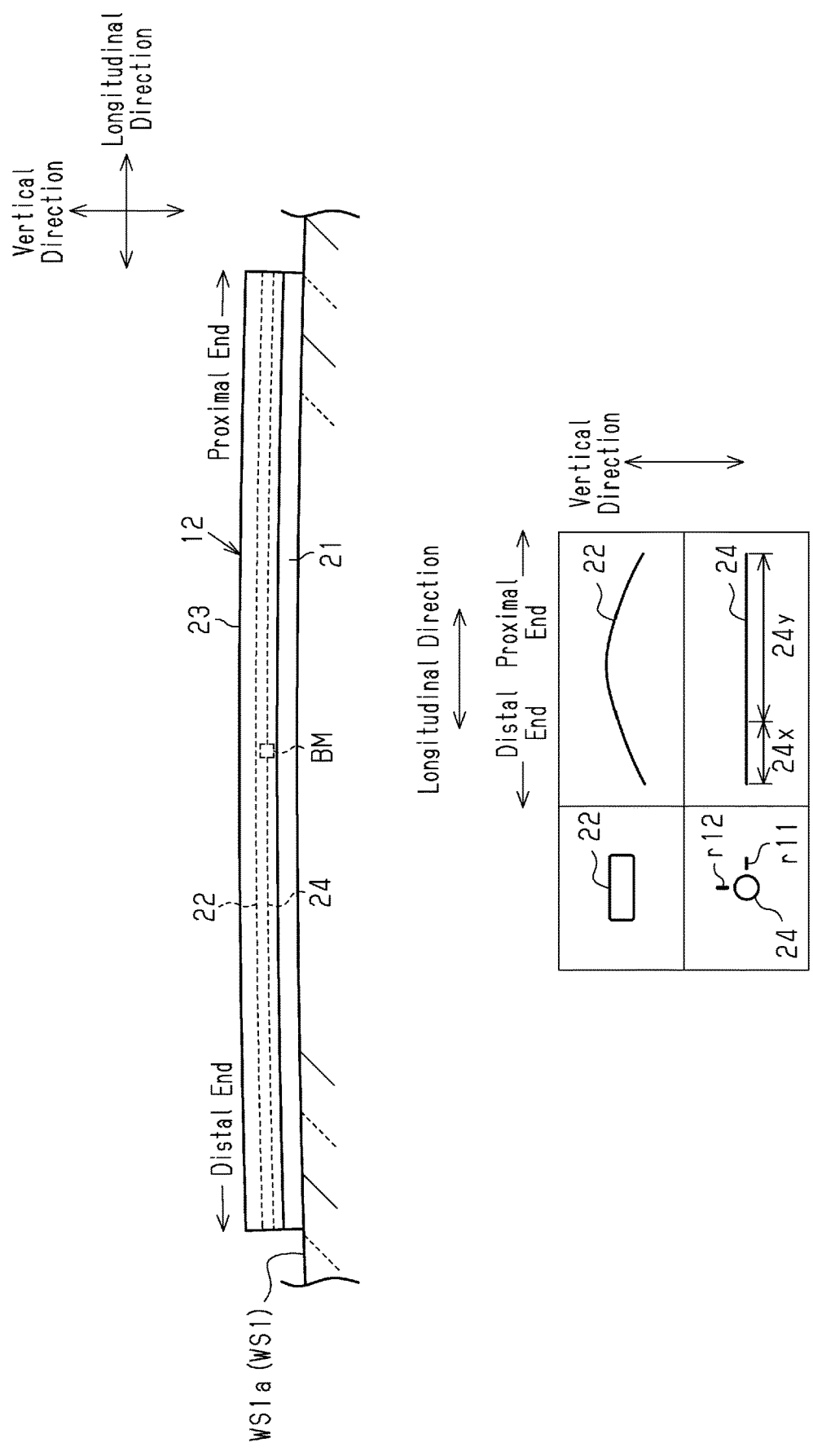
FIG. 6 is a diagram illustrating a wiping mode of the wiper blade in accordance with the first embodiment.

The main backings 22 have high rigidity in a flat plate direction that is generally parallel to the wiping surface WS1a, namely, the widthwise direction that is the wiping direction of the wiper blade 12. Thus, the main backings 22 have a function for maintaining the form of the wiper blade 12 (blade rubber 21) in such a direction during wiping. Further, the main backings 22 have generally the same length as the blade rubber 21 in the longitudinal direction and thus function to disperse pressing force which is transmitted from the wiper arm 11 to the wiper blade 12 and applied to the wiping surface WS1a in the longitudinal direction of the blade rubber 21. Further, as shown in FIGS. 5 and 6, each main backing 22 is entirely curved and has a larger curvature than the wiping surface WS1a. Thus, the main backings 22 function to apply pressing force to the wiping surface WS1a with its spring characteristics in addition to the pressing force from the wiper arm 11 and have the blade rubber 21 follow (in stable contact with) the curved form of the wiping surface WS1a that varies at each wiping position of the wiper blade 12.

In contrast, the sub-backing 24 functions in the same manner as the main backings 22. In addition, the sub-backing 24 has directivity resulting from the curved form at the distal end portion (portion corresponding to distal end portion of wiper blade) where the curving degree is large so that when the rotational position of the backing moving motor BM is changed during a wiping action of the wiper blade 12, the sub-backing 24 also functions to change the curved form of the wiper blade 12.

In further detail, the sub-backing 24 is set so that when arranged at a first rotational position r11 shown in FIG. 5, a distal end side portion 24x, which is, for example, generally one-third of the entire sub-backing 24 from the distal end in the longitudinal direction, is greatly curved locally toward a lower side (toward wiping surface WS1a) from the remaining central/proximal end side portion 24y in a side view (widthwise direction view) of the wiper blade 12. In contrast, the sub-backing 24 is set so that when rotated by 90° from the first rotational position r11 and arranged at a second rotational position r12 shown in FIG. 6, both of the distal end side portion 24x and the central/proximal end side portion 24y, that is, the entire sub-backing 24 in the longitudinal direction is horizontal in a side view (widthwise direction view). The position of the sub-backing 24 is changed by the backing moving motor BM to one of the first and second rotational positions r11 and r12 with its longitudinal axis serving as a rotation axis.

When the sub-backing 24 is arranged at the first rotational position r11, the distal end side portion 24x of the sub-backing 24 has a form greatly curved toward the lower side in a side view of the wiper blade 12, and the combined form of the distal end form of the sub-backing 24 and the curved form of the main backings 22 results in a form in which the distal portion side of the wiper blade 12 is greatly curved toward the lower side (toward wiping surface WS1a). Thus, when the distal end portion of the wiper blade 12 wipes the lower wiping range A11, which is the wiped portion of the wiping surface WS1a where the curvature is large, the sub-backing 24 is moved and arranged at the first rotational position r11. In this case, in a plan view (vertical view) of the wiper blade 12, the entire sub-backing 24 in the longitudinal direction is generally straight and parallel to the main backings 22 located at the two widthwise sides of the sub-backing 24.

When the sub-backing 24 is arranged at the second rotational position r12, the entire sub-backing 24 in the longitudinal direction has a generally horizontal form in a side view of the wiper blade 12, and the combined form of the generally horizontal form of the sub-backing 24 and the curved form of the main backings 22 results in a form in which the entire wiper blade 12 in the longitudinal direction is curved and bulged upward. Thus, when the entire wiper blade 12 wipes the upper wiping range A12, which is the wiped portion of the wiping surface WS1a where the curvature is small, the sub-backing 24 is moved and arranged at the second rotational position r12. In this case, in a plan view (vertical view) of the wiper blade 12, in the sole sub-backing 24, the distal end side portion 24x has a form curved toward one side in the widthwise direction of the wiper blade 12. However, the main backings 22 are disposed at the two widthwise sides of the sub-backing 24. Thus, the main backings 22 restrict the sub-backing 24 so that the entire sub-backing extends generally straight in the longitudinal direction.

As shown in FIG. 2, the wiper case 23 includes a case body 31 and a fin 32. The case body 31 is formed from a soft resin such as polypropylene (PP) and holds the head portion 21a, the main backings 22, and the sub-backing 24 of the blade rubber 21. The fin 32 is formed from rubber or an elastomer and molded integrally with the upper surface of the case body 31.

The case body 31 includes a sheath 31b and a rubber holder 31c. The sheath 31b is generally box-shaped and includes an accommodation hole 31a that accommodates the main backings 22 and the sub-backing 24. The rubber holder 31c holds the head portion 21a of the blade rubber 21 at the lower side of the sheath 31b. The main backings 22 and the sub-backing 24 are inserted and accommodated in the accommodation hole 31a, which has a rectangular cross section, of the sheath 31b in the longitudinal direction of the case body 31 (wiper case 23).

The rubber holder 31c, which has the form of a generally reversed trapezoid, widens toward the sheath 31b and narrows toward the lower side. The rubber holder 31c includes a pair of holding walls 31d, arranged in the widthwise direction of the case body 31 (wiper case 23), and the claws 31e, defined by the distal end portions (lower end portions) of the holding walls 31d. The holding walls 31d also have the form of generally reversed trapezoids with the claws 31e projecting from the lower ends toward each other in the widthwise direction. An accommodation groove 31f that accommodates an upper part (part upward from claw insertion groove 21d) of the head portion 21a of the blade rubber 21 is defined between the holding walls 31d including the claws 31e. The upper part of the head portion 21a of the blade rubber 21 is accommodated in the accommodation groove 31f between the holding walls 31d, and the claws 31e are inserted in the claw insertion grooves 21d of the head portion 21a. This holds the blade rubber 21 in the rubber holder 31c.

The fin 32 is arranged integrally with generally the entire upper surface of the case body 31 (sheath 31b). The fin 32 includes a gradually sloped portion 32a, which has a gradual slope extending upward from one end in the widthwise direction to a position beyond a central part in the widthwise direction end, and a projecting portion 32b, which projects as a steep slope from the gradually sloped portion 32a. When the fin 32 receives wind as the vehicle travels, the fin 32 applies pressing force that presses the blade rubber 21 toward the lower side (toward wiping surface WS1a) with the case body 31 (the wiper case 23).

The wiper case 23 is produced by two-color molding the case body 31, which is formed from a soft resin such as polypropylene, and the fin 32, which is formed from rubber or an elastomer. Further, the wiper case 23 is extrusion-molded in the longitudinal direction. A continuous material of the wiper case 23 produced through extrusion molding is cut into predetermined lengths to obtain wiper cases 23. In the wiper case 23, the case body 31 and the fin 32 are both formed by materials and structures that do not greatly interfere with the movement (spring characteristics and flexibility) of the main backings 22 and the sub-backing 24. The fin 32 has higher flexibility than the case body 31.

The operation of the present embodiment will now be described.

In one example, the wiper blade 12 of the present embodiment is used to wipe the windshield WS1 at the front side of the vehicle, and the wiper blade 12 wipes the wiping range A10 including the side end portion WS1x of the windshield WS1.

When a wiping instruction is issued for the windshield WS1, while checking the wiping position of the wiper blade 12 in the wiping range A10 with the wiping position detection sensor a1, the control circuit WC drives and controls the wiper motor WM to perform a wiping action by swinging the wiper blade 12 back and forth between the lower reversing position P11 and the upper reversing position P12. The control circuit WC also executes control for stopping the wiper blade 12 at the lower reversing position P11 that also serves as a stop position.

In synchronism with the drive-control of the wiper motor WM that generates wiping actions, the control circuit WC drives and controls the backing moving motor BM to switch the sub-backing 24 to the first rotational position r11 when the wiper blade 12 is in the lower wiping range A11 including the lower reversing position P11 and switch the sub-backing 24 to the second rotational position r12 when the wiper blade 12 is in the upper wiping range A12 including the upper reversing position P12. The control circuit WC changes the rotational position of the sub-backing 24 as the wiper blade 12 passes by the border position P13 between the lower wiping range A11 and the upper wiping range A12. In this case, the switching action of the rotational position of the sub-backing 24 is much faster than the wiping action of the wiper blade 12, and the switching is completed near the border position P13.

As shown in FIG. 5, when the sub-backing 24 is arranged at the first rotational position r11, in a side view of the wiper blade 12, the distal end side portion 24x of the sub-backing 24 is greatly curved toward the lower side so that the form obtained when combined with the main backings 22 greatly deforms the distal end portion side of the wiper blade 12 toward the lower side. In this case, the wiper blade 12 is located in the lower wiping range A11, and the distal end portion of the wiper blade 12 wipes the portion of the wiping surface WS1a, which has a large curvature. Thus, the form of the wiper blade 12 is changed in conformance with the curved form of the wiping surface WS1a so that the wiper blade 12 contacts the wiping surface WS1a in a preferred manner.

As shown in FIG. 6, when the sub-backing 24 is arranged at the second rotational position r12, in a side view of the wiper blade 12, the entire sub-backing 24 in the longitudinal direction is straight so that the form obtained when combined with the main backings 22 deforms the entire wiper blade 12 in the longitudinal direction so as to be curved and bulged upward. In this case, the wiper blade 12 is located in the upper wiping range A12, and the entire wiper blade 12 in the longitudinal direction wipes the wiping surface WS1a, which has a small curvature. Thus, the form of the wiper blade 12 is changed in conformance with the curved form of the wiping surface WS1a so that the wiper blade 12 contacts the wiping surface WS1a in a preferred manner.

In this manner, even with the wiping surface WS1a of the present embodiment in which the curved forms of the lower wiping range A11 and the upper wiping range A12 change greatly, the sub-backing 24 passively changes the curved form of the wiper blade 12 in accordance with the wiping ranges A11 and A12 so that the wiper blade 12 (blade rubber 21) entirely contacts the wiping range A10 of the wiping surface WS1a. This further improves the wiping capability.

The advantages of the present embodiment will now be described.

(1-1) In the wiper blade 12 of the present embodiment, the main backings 22 and the sub-backing 24 are accommodated in the longitudinal direction in the wiper case 23 arranged next to each other, and the backing moving motor BM changes the rotational position of the sub-backing 24 to locally change the curved form of the wiper blade 12 in the longitudinal direction in accordance with the curved form of the wiping surface WS1a. Thus, even when the curved form of the wiping surface WS1a changes greatly like in the present embodiment, the wiper blade 12 (blade rubber 21) contacts the entire wiping range A10 in a preferred manner. This further improves the wiping capability.

(1-2) The wiper blade 12 includes the backing moving motor BM to change the rotational position of the sub-backing 24. Thus, the sub-backing 24 is easily driven and controlled.

(1-3) The backing moving motor BM is located in the distal end coupling portion 11a, which is generally C-shaped and open toward the lower side of the wiper arm 11 (portion opposed to wiper blade 12), and covered by the distal end coupling portion 11a. This keeps the outer appearance of the wiper 10 satisfactory.

(1-4) There are two main backings 22, and the sub-backing 24 is disposed between the two main backings 22 in the widthwise direction. Thus, when the rotational position of the sub-backing 24 is changed, the main backings 22 restrict projection of the curved form of the sub-backing 24 in the widthwise direction so as to reduce the effect on the wiper case 23.

(1-5) Based on the position of the wiper blade 12 detected by the wiping position detection sensor a1, the control circuit WC changes the rotational position of the sub-backing 24 in accordance with the wiping position of the wiper blade 12. This further ensures that the curved form of the wiper blade 12 is changed in accordance with the curved form of the wiping surface WS1a.

Second Embodiment

A wiper blade in accordance with a second embodiment will now be described.

Figure 7:
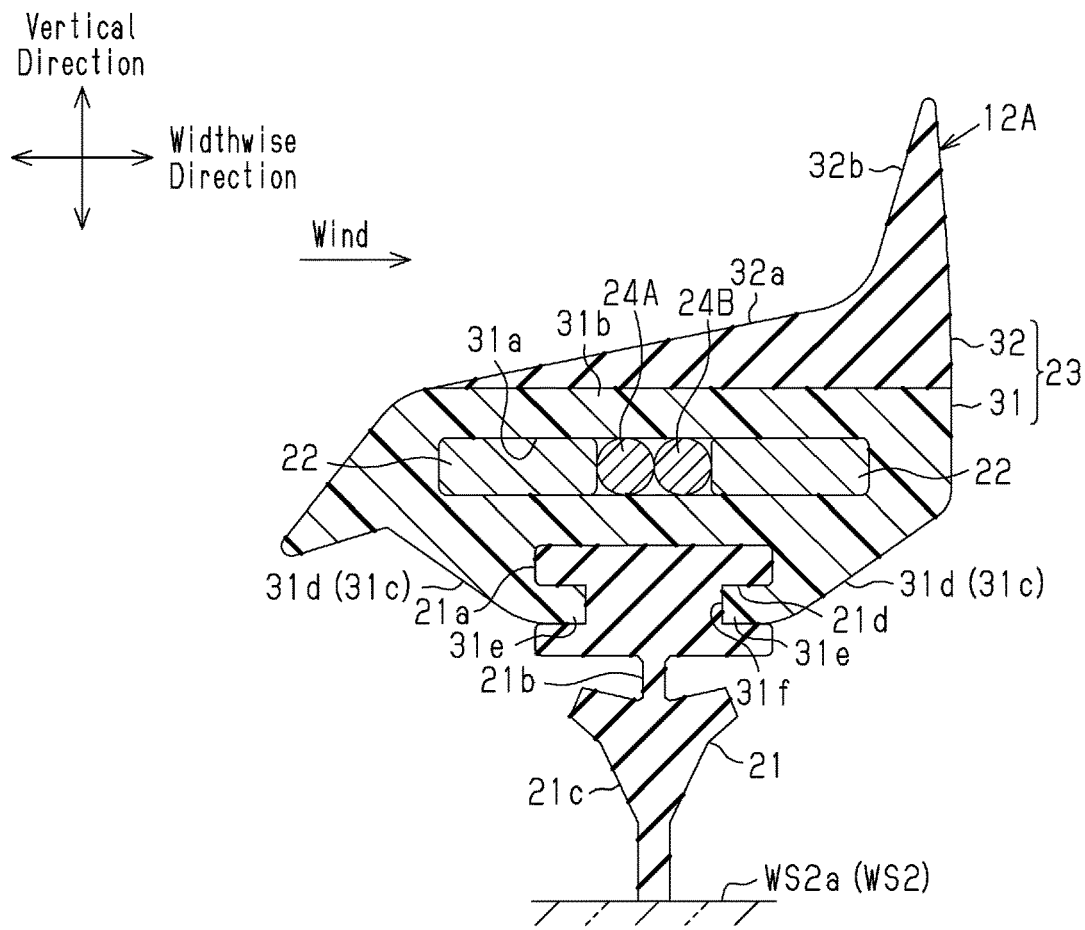
FIG. 7 is a widthwise direction cross-sectional view of a wiper blade in accordance with a second embodiment.
Figure 8:
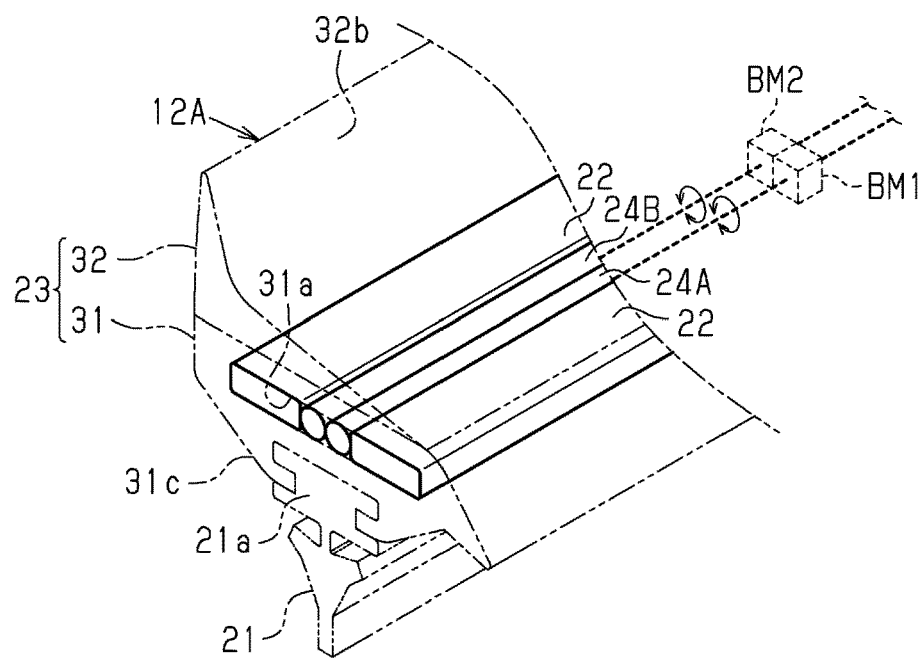
FIG. 8 is a perspective view of the wiper blade in accordance with the second embodiment.

As shown in FIGS. 7 and 8, a wiper blade 12A of the present embodiment includes two sub-backings, namely, two sub-backings 24A and 24B serving as a second backing disposed between the two main backings 22. The main backings 22 are arranged next to each other on the same plane. The sub-backings 24A and 24B are set to have curved forms having different directivities. Further, the rotational positions of the sub-backings 24A and 24B are independently changed by backing moving motors BM1 and BM2 serving as electric drive devices, respectively. Otherwise, the structure is the same as the first embodiment.

Figure 9:
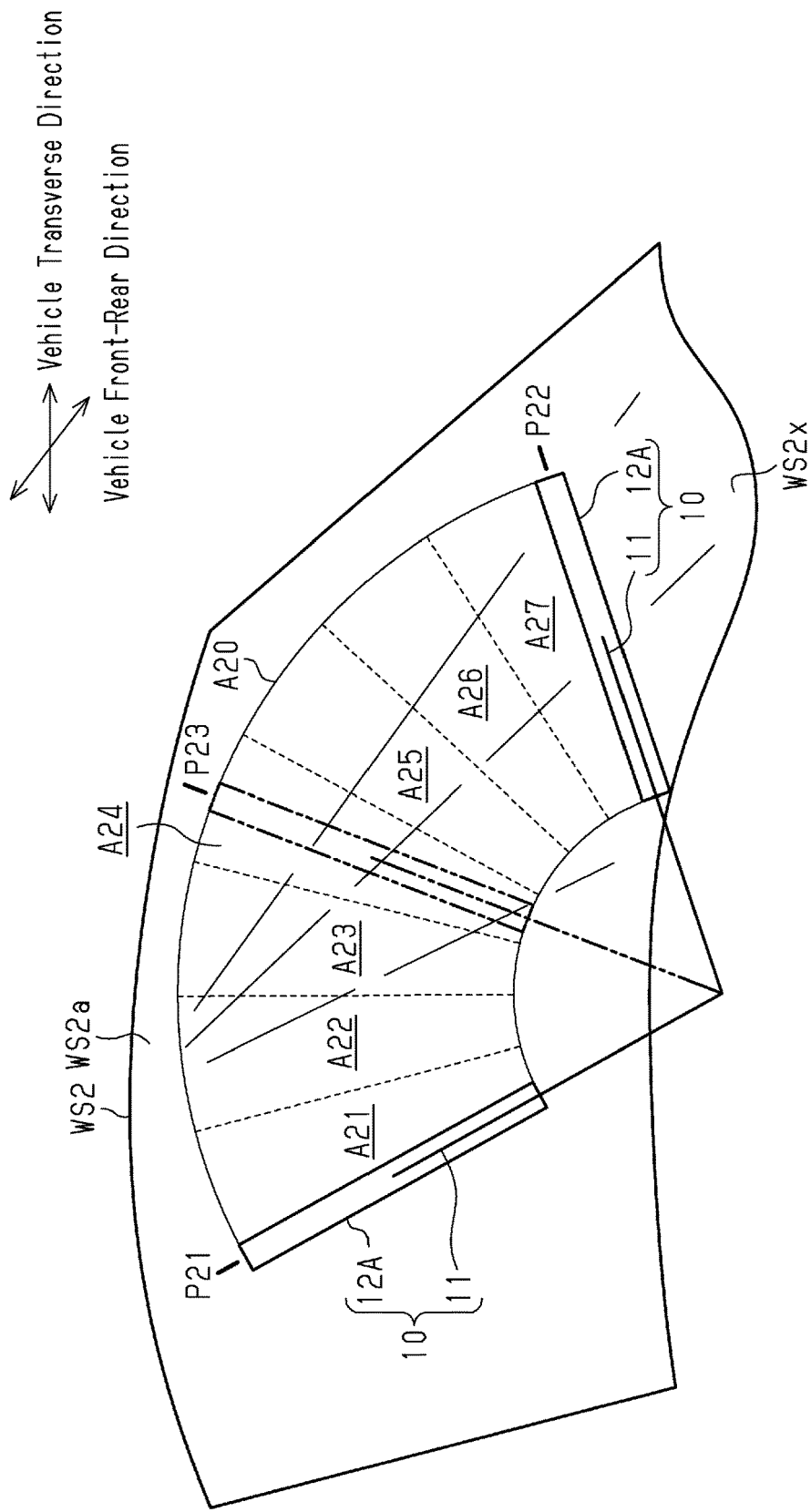
FIG. 9 is a diagram illustrating a wiping mode of the wiper blade in accordance with the second embodiment.

In one example, the wiper blade 12A of the present embodiment is used to wipe a wiping range A20 including a central recess WS2x in a windshield WS2 at a rear side of the vehicle as shown in FIG. 9. The central recess WS2x of the windshield WS2 is located at a central portion in a transverse direction of the vehicle extending in a front-rear direction of the vehicle and set so that the recessed form is enlarged toward the rear of the vehicle. In the wiping range A20, which includes the central recess WS2x, particularly, the central portion of the wiper blade 12A corresponding to the central recess WS2x and also the distal end portion that traverses the central recess WS2x wipes the portion of a wiping surface WS2a where the curved form changes greatly.

More specifically, the wiping range A20 between an upper reversing position P21 and a lower reversing position P22, which serve as stop positions, are divided into seven wiping ranges A21 to A27 in the present embodiment. In the wiping range A21 including the upper reversing position P21, the entire wiper blade 12A in the longitudinal direction wipes the wiping surface WS2a where the curvature is small. In the wiping range A24 including a middle position P23, the central portion and the distal end portion of the wiper blade 12A in the longitudinal direction is affected by the central recess WS2x. In the wiping range A27 including the lower reversing position P22, the central portion of the wiper blade 12A in the longitudinal direction is greatly affected by the central recess WS2x. In the present embodiment, the control circuit WC detects the position of the wiper blade 12A with the wiping position detection sensor a1 and recognizes the positions P21, P23, and P22 and the wiping ranges A21 to A27.

The sub-backings 24A and 24B used in the present embodiment have directivities resulting from different curved forms. When the wiper blade 12A is performing wiping, the rotational positions of the sub-backings 24A and 24B are changed by the backing moving motors BM1 and BM2 to change the curved form of the wiper blade 12A.

Figure 10:
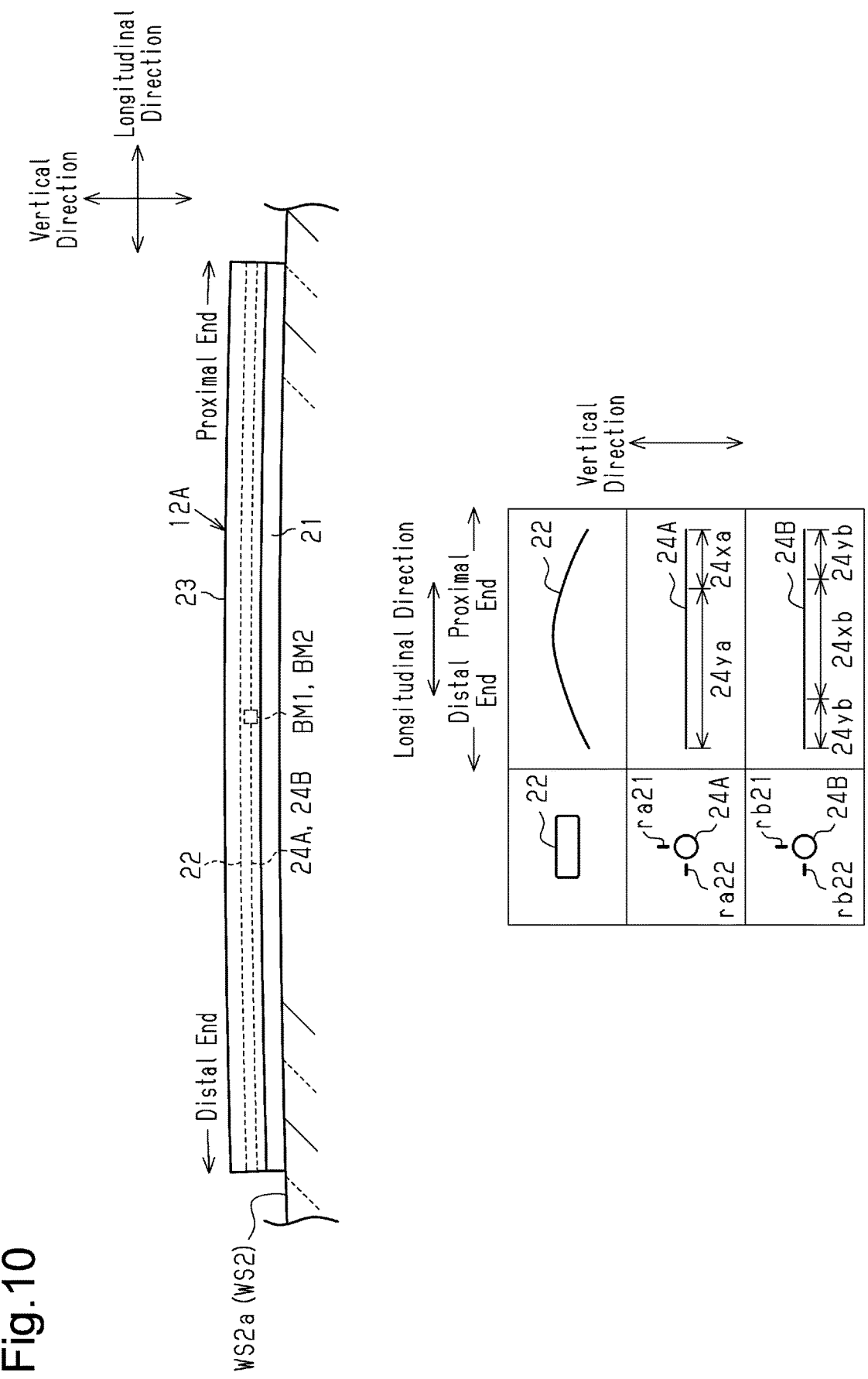
FIG. 10 is a diagram illustrating a wiping mode of the wiper blade in accordance with the second embodiment.

In further detail, when the sub-backing 24A is arranged at a first rotational position ra21 shown in FIG. 10, in a side view of the wiper blade 12A, a distal end side portion 24xa and a central/proximal end side portion 24ya are both set to entirely have a generally horizontal form in the longitudinal direction. In the same manner, when the sub-backing 24B is arranged at a first rotational position rb21 shown in FIG. 10, in a side view of the wiper blade 12A, a central portion 24xb and an end side portion 24yb are both set to entirely have a generally horizontal form in the longitudinal direction. In contrast, when the sub-backing 24A is rotated by 90° from the first rotational position ra21 to a second rotational position ra22 shown in FIG. 11, the distal end side portion 24xa is greatly curved locally toward an upper side (away from wiping surface WS2a) from the central/proximal end side portion 24ya. Further, when the sub-backing 24B is rotated by 90° from the first rotational position rb21 to a second rotational position rb22 shown in FIG. 12, the central portion 24xb in the longitudinal direction is greatly curved (bulged) locally toward the lower side (toward wiping surface WS2a) from the end side portion 24yb. In this manner, the sub-backing 24A is set for distal end portion adjustment of the wiper blade 12A, and the sub-backing 24B is set for central portion adjustment.

In synchronism with the drive-control of the wiper motor WM that generates the wiping action, the control circuit WC drives and controls the backing moving motors BM1 and BM2 to control and change the form of the wiper blade 12A so that the combined form of the sub-backings 24A and 24B and the main backings 22 conforms to the curved forms of the wiping ranges A21 to A27 in the wiping surface WS2a.

The operation of the present embodiment will now be described.

In one example, the wiper blade 12A of the present embodiment is used to wipe the windshield WS2 at the rear side of the vehicle, and the wiper blade 12A wipes the wiping range A20 including the central recess WS2x of the windshield WS2 shown in FIG. 9.

When a wiping instruction is issued for the windshield WS2, while checking the wiping position of the wiper blade 12A in the wiping range A20 with the wiping position detection sensor a1, the control circuit WC drives and controls the wiper motor WM to perform wiping action by swinging the wiper blade 12A back and forth between the upper reversing position P21 and the lower reversing position P22. The control circuit WC also executes control for stopping the wiper blade 12A at the upper reversing position P21 that also serves as a stop position.

In synchronism with the drive-control of the wiper motor WM that generates the wiping action, the control circuit WC drives and controls the backing moving motors BM1 and BM2 to change the rotational positions of the sub-backings 24A and 24B.

When the wiper blade 12A is located in the wiping range A21 including the upper reversing position P21 shown in FIGS. 9 and 10, the sub-backing 24A is switched to the first rotational position ra21, and the sub-backing 24B is switched to the first rotational position rb21. Consequently, in a side view of the wiper blade 12A, the sub-backings 24A and 24B both become generally horizontal so that the form obtained when combined with the main backings 22 deforms the entire wiper blade 12A in the longitudinal direction so as to be curved and bulged upward. In this case, the wiper blade 12A is located in the wiping range A21, and the entire wiper blade 12A in the longitudinal direction wipes the wiping surface WS2a, which has a small curvature. Thus, the form of the wiper blade 12A is changed in conformance with the curved form of the wiping surface WS2a so that the wiper blade 12A contacts the wiping surface WS2a in a preferred manner.

Figure 12:
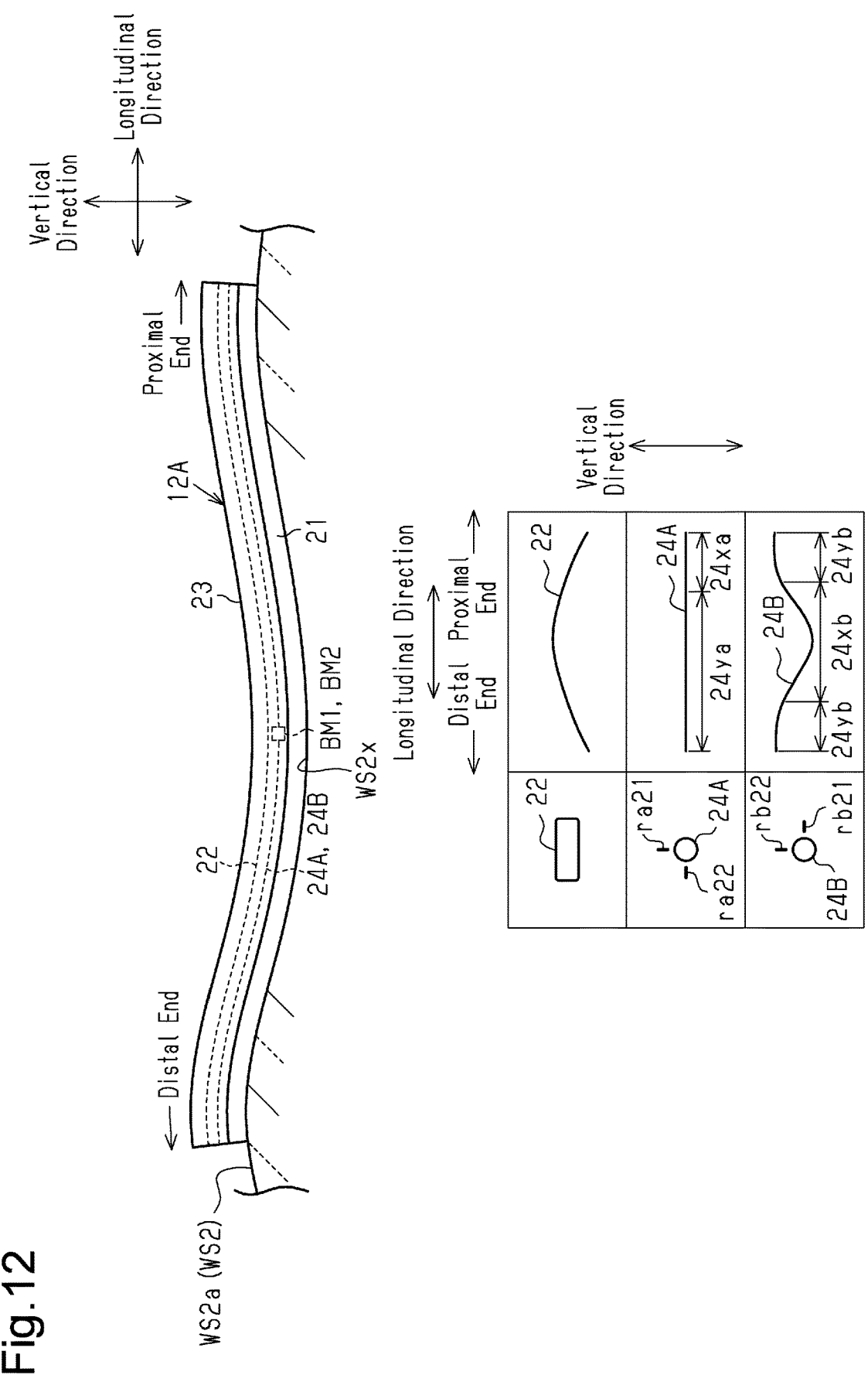
FIG. 12 is a diagram illustrating a wiping mode of the wiper blade in accordance with the second embodiment.

When the wiper blade 12A is located in the wiping range A27 including the lower reversing position P22 shown in FIGS. 9 and 12, the sub-backing 24A is switched to the first rotational position ra21, and the sub-backing 24B is rotated by 90° from the first rotational position rb21 and switched to the second rotational position rb22. Consequently, in a side view of the wiper blade 12A, the sub-backing 24A becomes generally horizontal, and the central portion 24xb of the sub-backing 24B is bulged toward the lower side (toward wiping surface WS2a) so that the form obtained when combined with the main backings 22 deforms the central portion of the wiper blade 12A in the longitudinal direction so as to be curved and bulged downward. In this case, the wiper blade 12A is located in the wiping range A27, and the central portion of the wiper blade 12A in the longitudinal direction wipes the wiping surface WS2a that is greatly affected by the central recess WS2x. Thus, the form of the wiper blade 12A is changed in conformance with the curved form of the wiping surface WS2a so that the wiper blade 12A contacts the wiping surface WS2a in a preferred manner.

Further, when the wiper blade 12A is located in the wiping range A21 including the upper reversing position P21, the wiping range A27 including the lower reversing position P22, or the wiping ranges A22 to A26, the sub-backings 24A and 24B are switched to the first rotational position ra21, the second rotational position ra22, or a middle rotational position, and the sub-backing 24B is switched to a first rotational position rb21, a second rotational position rb22, or a middle position. This changes the form of the wiper blade 12A in conformance with the curved shape of the wiping surface WS2a.

Figure 11:
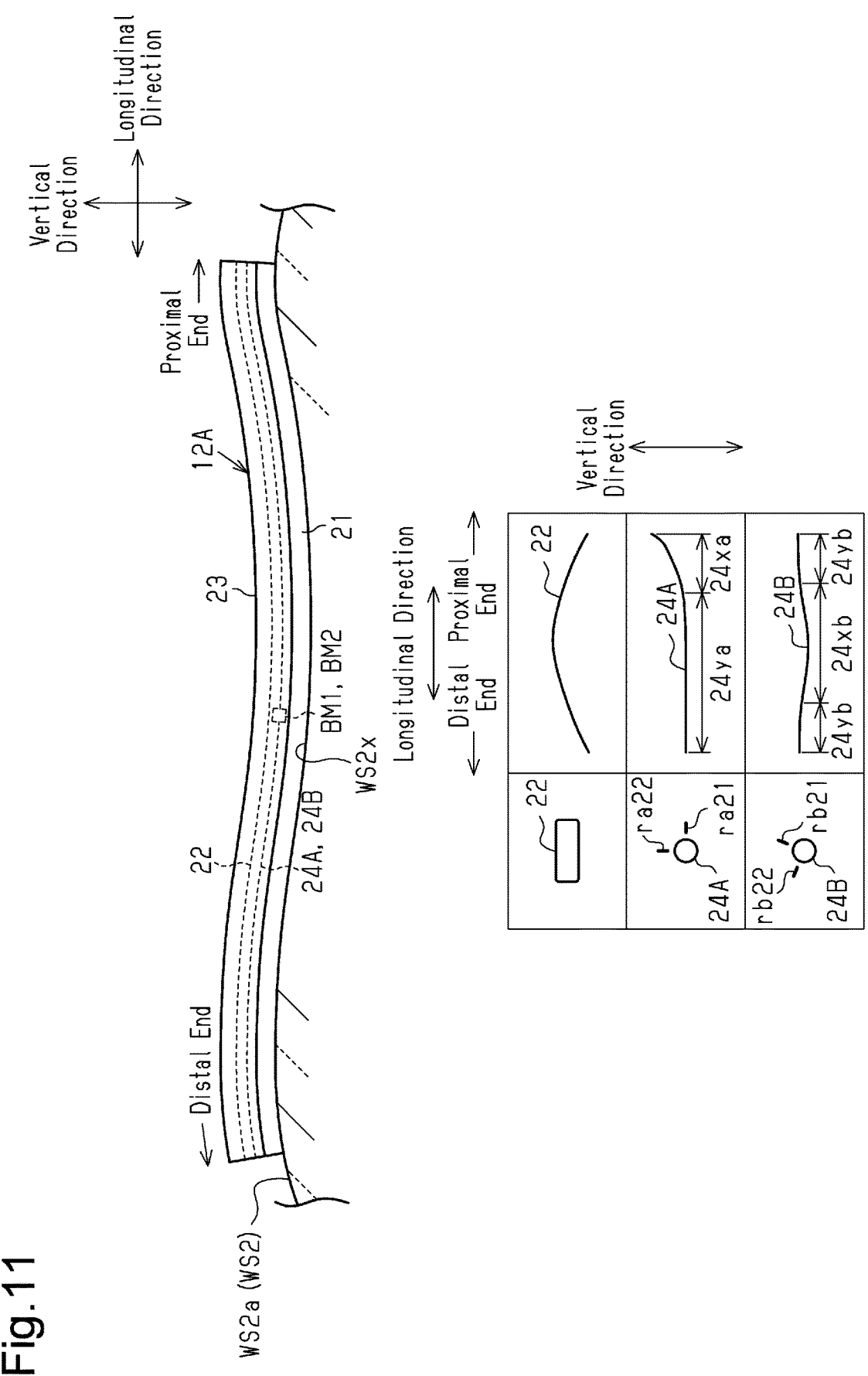
FIG. 11 is a diagram illustrating a wiping mode of the wiper blade in accordance with the second embodiment.

For example, when the wiper blade 12A is located in the wiping range A24 including the middle position P23 shown in FIGS. 9 and 11, the sub-backing 24A is rotated by 90° from the first rotational position ra21 to the second rotational position ra22, and the sub-backing 24B is rotated by 22.5 (90/4°) from the first rotational position rb21 and switched to a middle rotational position. Consequently, in a side view of the wiper blade 12A, the distal end side portion 24xa of the sub-backing 24A is greatly curved toward the upper side (away from wiping surface WS2a) and the central portion 24xb of the sub-backing 24B is slightly bulged toward the lower side (toward wiping surface WS2a) so that the form obtained when combined with the main backings 22 changes the form of the wiper blade 12A so that the distal end portion and the central portion of the wiper blade 12A are in conformance with the curved form of the wiping surface WS2a of the wiping range A24 and so that the wiper blade 12A contacts the wiping surface WS2a in a preferred manner. The form of the wiper blade 12A is also changed in conformance with the curved form of the wiping surface WS2a ahead of and behind the wiping range A24.

In this manner, even with the wiping surface WS2a of the present embodiment in which the curved form in the wiping range A20 changes in a complicated manner, the two differently set sub-backings 24A and 24B passively change the curved form of the wiper blade 12A in accordance with the wiping ranges A21 to A27 so that the wiper blade 12A (blade rubber 21) entirely contacts the wiping range A20 of the wiping surface WS2a. This further improves the wiping capability.

The advantages of the second embodiment will now be described.

(2-1) In the present embodiment, the curved form of the windshield WS2 and the number or the like of the sub-backings 24A and 24B differ from the first embodiment. Nevertheless, the present embodiment has advantages (1-1) to (1-5) of the first embodiment.

(2-2) The wiper blade 12A of the present embodiment includes the two sub-backings 24A and 24B, with each being configured so that its rotational position can be independently changed. This allows the wiper blade 12A to have a variety of curved forms. Thus, even with the wiping surface WS2a of the present embodiment having a curved form that changes in a further complicated manner, the wiper blade 12A (blade rubber 21) entirely contacts the wiping range A20. This further improves the wiping capability.

The present embodiment may be modified as described below. The above embodiment and the modified examples described below may be combined as long as there is no technical contradiction.

Figure 13:
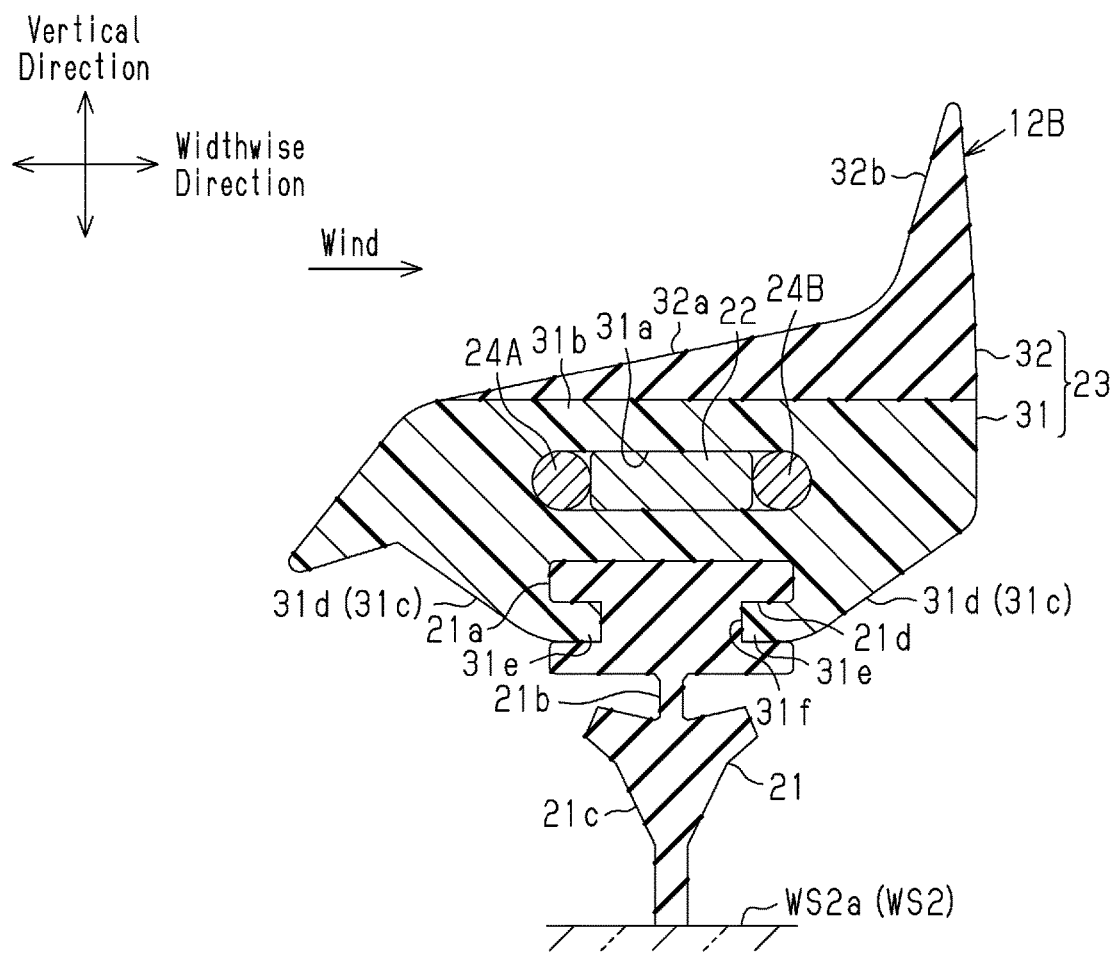
FIG. 13 is a widthwise direction cross-sectional view of a wiper blade in accordance with a further example.

In the second embodiment, the two sub-backings 24A and 24B are disposed next to each other between the two main backings 22. However, the arrangement of the sub-backings 24A and 24B is not limited in such a manner and can be changed. For example, the sub-backings 24A and 24B may be separated by disposing one of the sub-backings 24A and 24B between the two main backings 22 and disposing the other one at the outer side of the two main backings 22 in the widthwise direction. Further, for example, as shown in FIG. 13, the wiper blade 12B may include one main backing 22, and the sub-backings 24A and 24B may be separated and disposed at opposite sides of the main backing 22 in the widthwise direction.

The first embodiment may include one main backing 22 and a sub-backing 24 disposed at one side of the main backing 22 in the widthwise direction.

Figure 14:
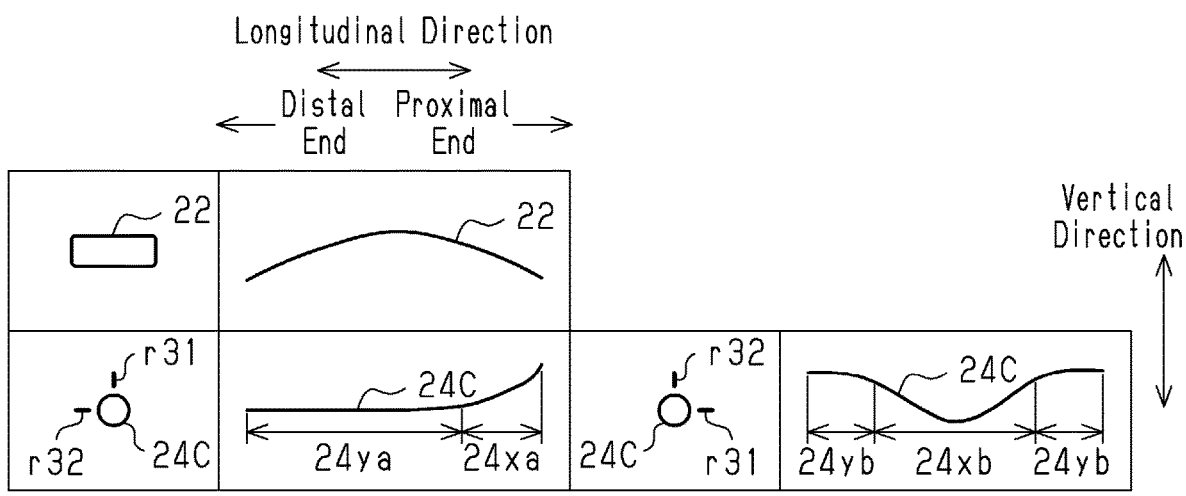
FIG. 14 is a diagram of a wiper blade in accordance with a further example.

The sub-backings 24A and 24B used in the second embodiment may be configured as a sub-backing 24C serving as a single second backing shown in FIG. 14. The wiper blade will have a structure such as that of the wiper blade 12 shown in FIG. 2. In a side view of the wiper blade, when the sub-backing 24 is arranged at a first rotational position r31, the distal end side portion 24xa is greatly curved toward the upper side from the central/proximal end side portion 24ya. When the sub-backing 24 is rotated by 90° from the first rotational position r31 to a second rotational position r32, the central portion 24xb is greatly curved (bulged) toward the lower side from the end side portion 24yb. The sub-backing 24C having such a complicated curved form can be used to obtain a wiping capability similar to that of the wiper blade 12A of the second embodiment that uses the two sub-backings 24A and 24B.

The wiper blade 12 of the first embodiment includes one sub-backing 24 and the wiper blade 12A of the second embodiment includes two sub-backings 24A and 24B. However, there may be three or more sub-backings.

Further, a wiper blade may be configured as described below.

Figure 15:
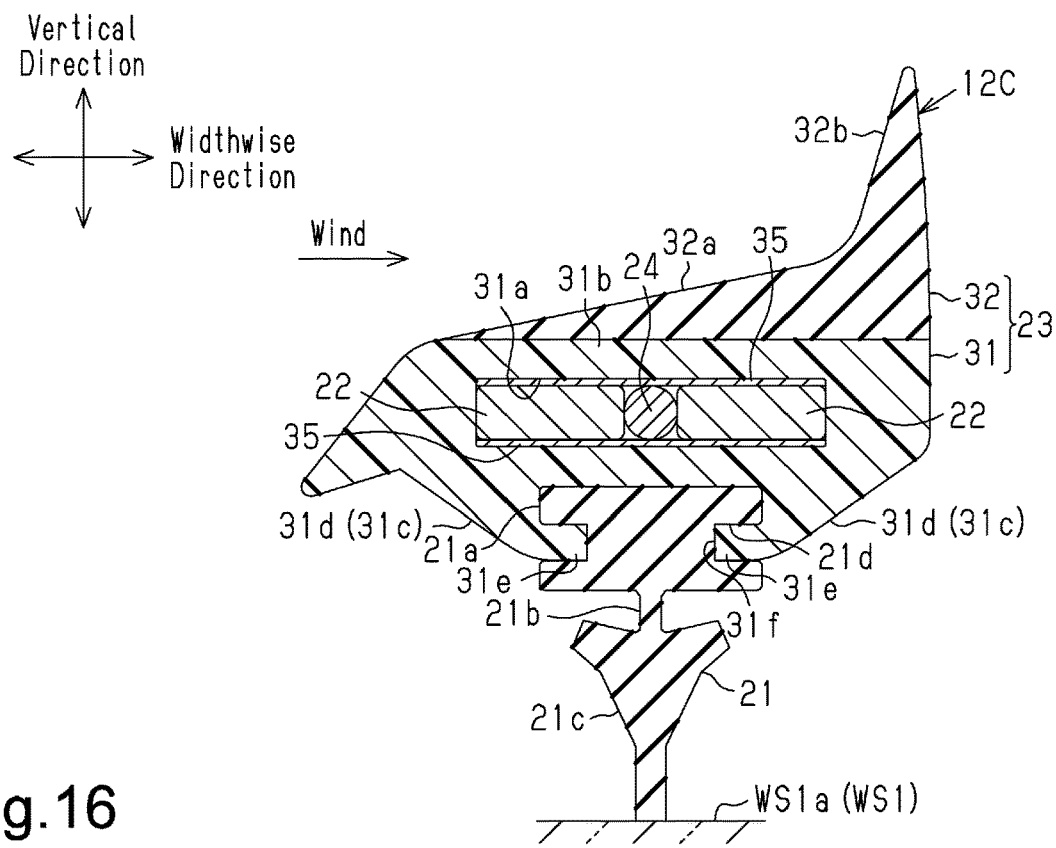
FIG. 15 is a widthwise direction cross-sectional view of a wiper blade in accordance with a further example.

FIG. 15 show a wiper blade 12C based on the wiper blade 12 of the first embodiment. Protection films 35 serving as an auxiliary member are inserted together with the main backings 22 and the sub-backing 24 in the accommodation hole 31a of the wiper case 23. The protection films 35 are, for example, films of stainless steel (SUS). The protection film 35 has a length in the longitudinal direction that is generally the same as that of the main backings 22 (sub-backing 24). Further, the protection film 35 has a width that is generally the same as the entire width of the main backings 22 and the sub-backing 24 lined in the widthwise direction in the accommodation hole 31a. There are two protection films 35, one disposed between the upper side of the main backings 22 and sub-backing 24 and the upper wall surface of the accommodation hole 31a, and the other disposed between the lower side of the main backings 22 and sub-backing 24 and the lower wall surface of the accommodation hole 31a. Thus, when the sub-backing 24 is pivoted to change the state (curved form) of the wiper blade 12C, the arrangement of the protection films 35 prevents direct slide-contact with the wiper case 23 and protects the wiper case 23 from wear caused by the pivoted sub-backing 24. Further, the sub-backing 24 can be smoothly pivoted. The material and dimensions of the protection films 35 are set taking into consideration the curving characteristics of the wiper blade 12C. The protection films 35 may be used in the wiper blade 12A of the second embodiment or the wiper blade 12B shown in FIG. 13.

Figure 16:
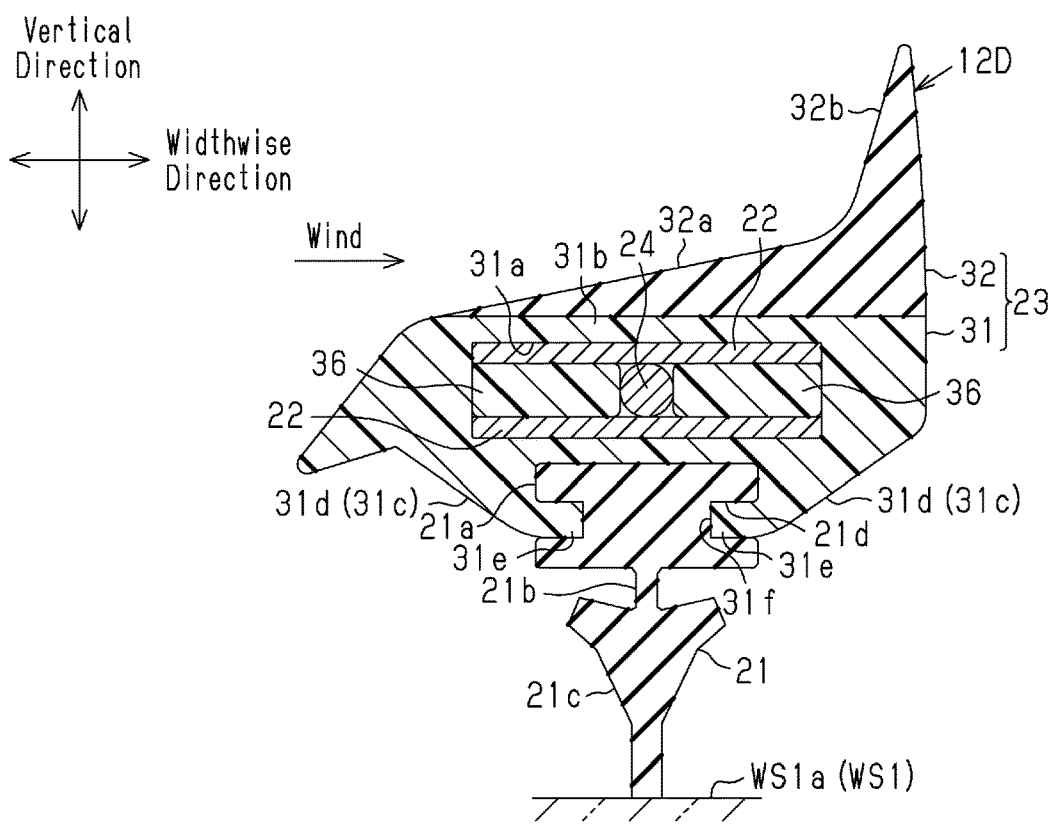
FIG. 16 is a widthwise direction cross-sectional view of a wiper blade in accordance with a further example.

FIG. 16 shows a wiper blade 12D with a different arrangement of the main backings 22 and the sub-backing 24. The main backings 22 are disposed at two sides of the sub-backing 24 in the vertical direction, and the two main backings 22 sandwich the sub-backing 24 in the vertical direction. The main backings 22 used here are, for example, thin and elongated in the widthwise direction. Further, spacer members 36 are disposed in the vacant space at the two sides of the sub-backing 24 in the widthwise direction. The spacer members 36 maintains the vertical distance between the two main backings 22 and restricts the sub-backing 24 in the widthwise direction. The material and dimensions of the spacer members 36 are set taking into consideration the curving characteristics of the wiper blade 12D. The structure in which the sub-backing 24 is held between the two main backings 22 in the vertical direction may be used for the wiper blade 12A of the second embodiment.

Figure 17:
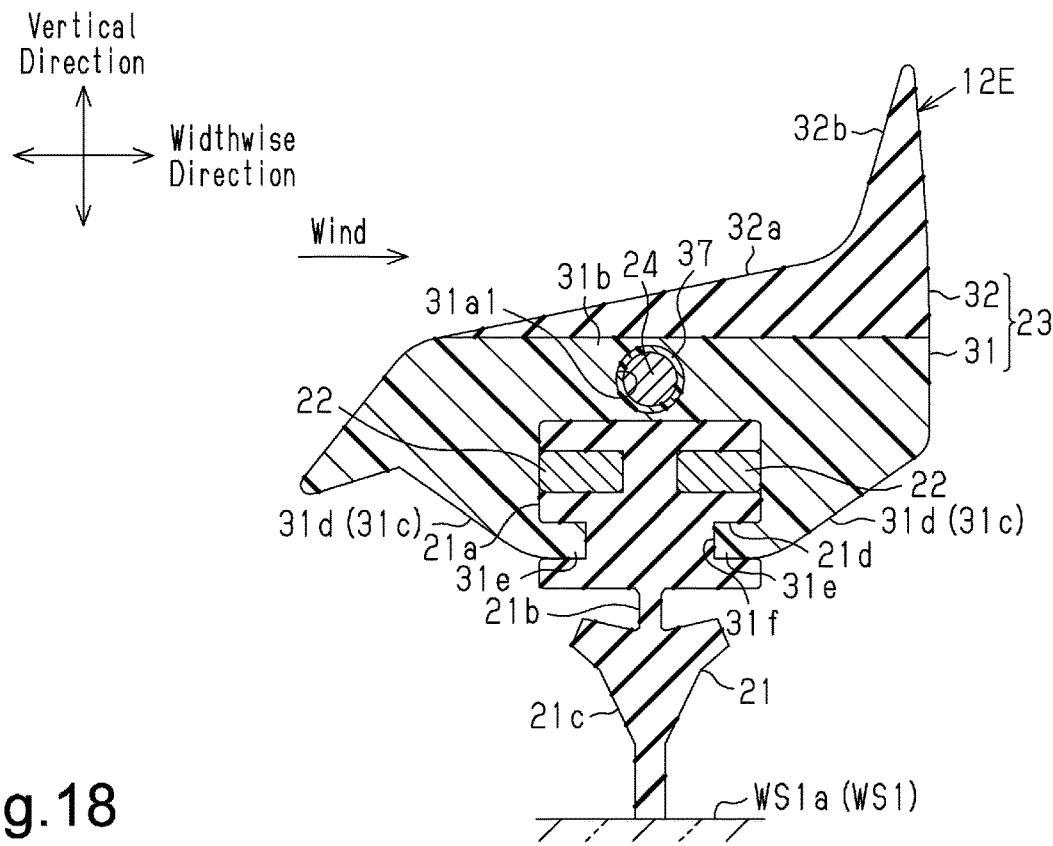
FIG. 17 is a widthwise direction cross-sectional view of a wiper blade in accordance with a further example.

FIG. 17 shows a wiper blade 12E with a different arrangement of the main backings 22 and the sub-backing 24. The two main backings 22 are attached to the two widthwise sides of the head portion 21a of the blade rubber 21, which is accommodated in the accommodation groove 31f of the wiper case 23. The sub-backing 24 is inserted into an accommodation hole 31a1 having a circular cross section above the main backings 22. That is, the main backings 22 are attached to the blade rubber 21, and the sub-backing 24 is disposed independently at a different position located upward from the main backings 22. In this structure, two or more sub-backings 24 may be used like in the second embodiment or the like.

The outer surface of the sub-backing 24 shown in FIG. 17 is covered by a coating 37. The coating 37 is, for example, formed from a low friction material such as Teflon (registered trademark). The coating 37 protects the wiper case 23 from wear caused by the pivoted sub-backing 24 and allows the sub-backing 24 to be smoothly pivoted. The material and dimensions of the coating 378 are set taking into consideration the curving characteristics of the wiper blade 12D.

Figure 18:
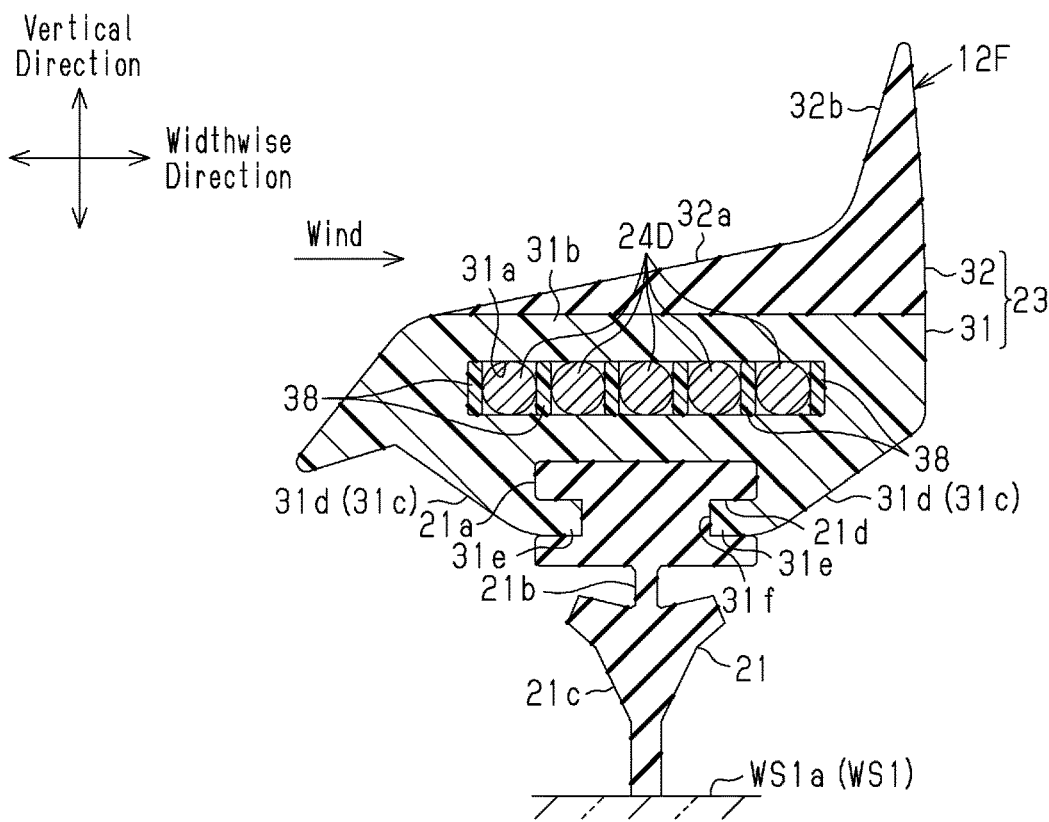
FIG. 18 is a widthwise direction cross-sectional view of a wiper blade in accordance with a further example.

FIG. 18 shows a wiper blade 12F having a structure equivalent to the arrangement of the main backings 22 and the sub-backing 24. A plurality of (e.g., five) backings are arranged next to one another in the widthwise direction. The backings 24D are each set to have a form obtaining a different directivity, and the rotational positions of the backings 24D are changed by corresponding backing moving motors (not shown). The backings 24D each serve as a state changing member that changes the state (curved form) of the wiper blade 12F when the rotational positions of the backings 24D are combined. The backings 24D cooperate with one another to have the function of the main backings 22 described above. A spacer member 38 is disposed between the wiper case 23 and the backings 24D located at the ends and between adjacent ones of the backings 24D to prevent direct contact (slide-contact) between adjacent members. The material and dimensions of the spacer members 38 are set taking into consideration the curving characteristics of the wiper blade 12F.

Figure 19:
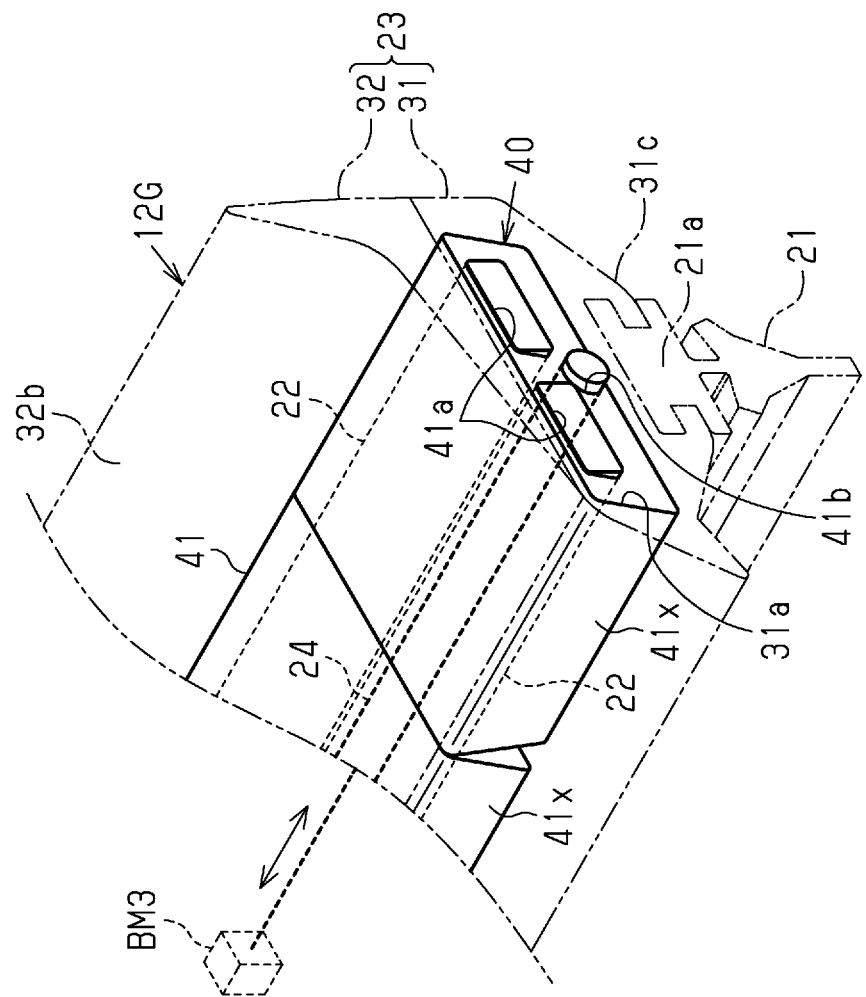
FIG. 19 is a perspective view of a wiper blade in accordance with a further example.
Figure 20:
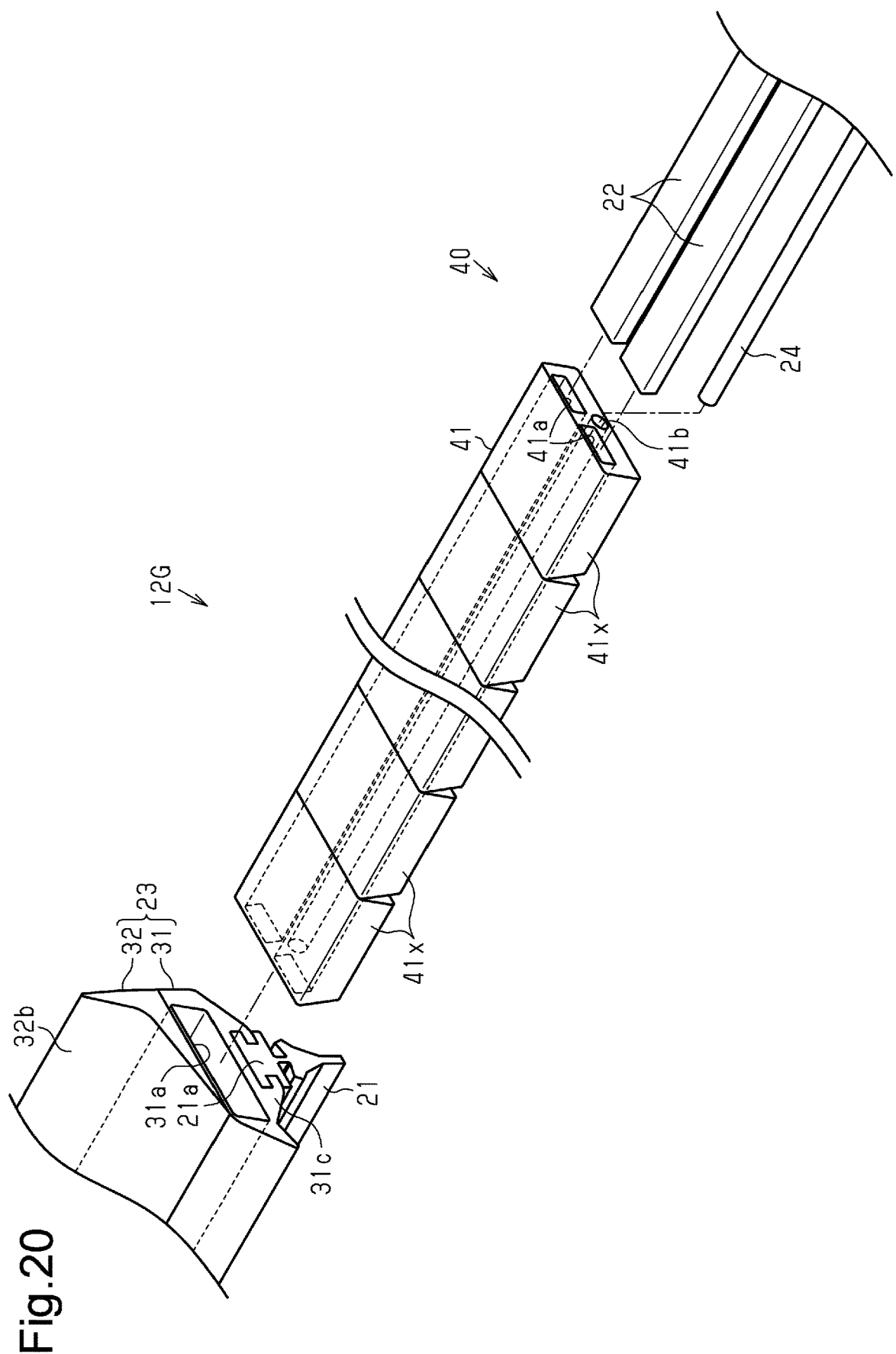
FIG. 20 is an exploded perspective view of a wiper blade in accordance with a further example.
Figure 21:
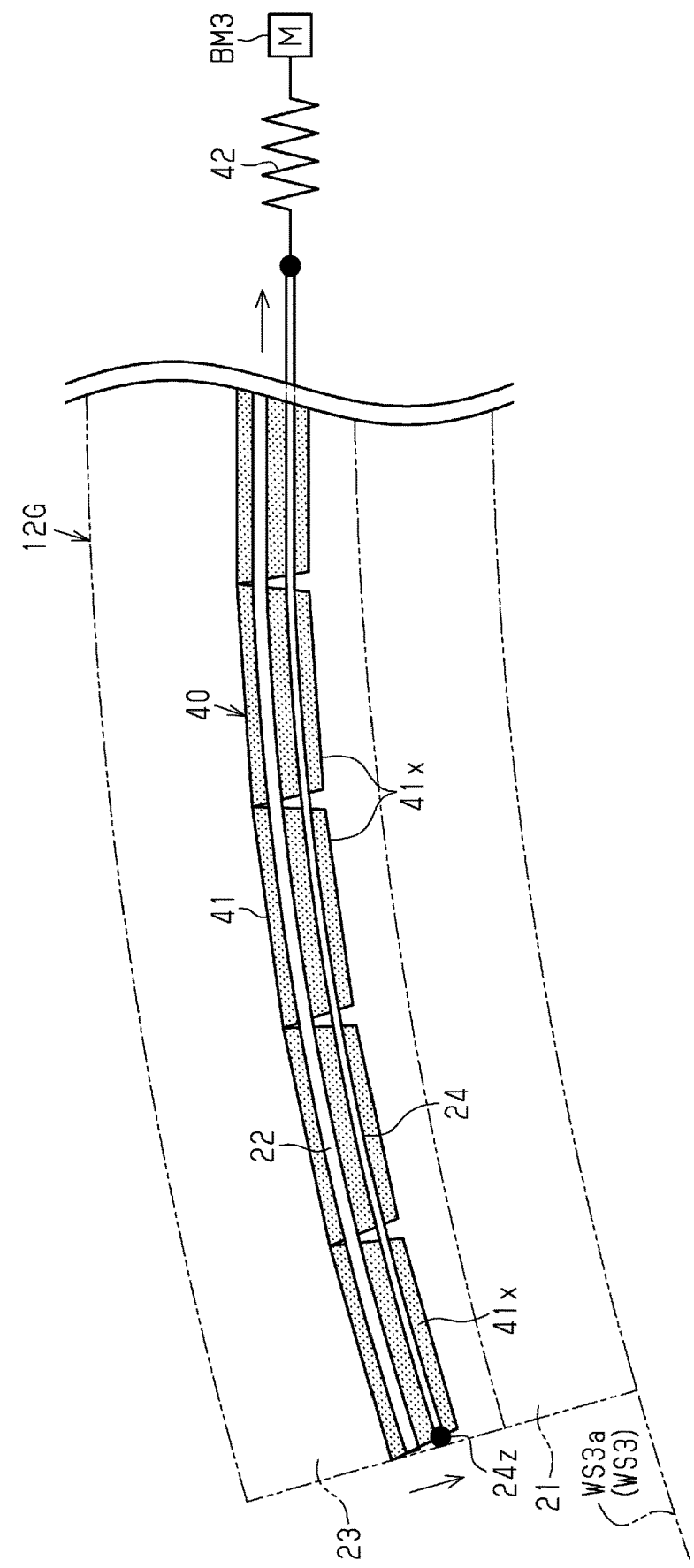
FIG. 21 is a diagram illustrating a wiping mode of the wiper blade in accordance with a further example.

FIGS. 19, 20, and 21 show a wiper blade 12G in which a backing unit 40 is inserted in the longitudinal direction and accommodated in the accommodation hole 31a of the case body 31, which forms the wiper case 23. The backing unit 40 is a sub-assembly of two main backings 22 and one sub-backing 24. The backing unit 40, which is a sub-assembly of the main backings 22 and the sub-backing 24, facilitates coupling to the wiper case 23. The accommodation hole 31a, the backing unit 40, and a block member 41, which will be described later, configure a rectangular form in a view of the wiper blade 12G in the longitudinal direction, and the long sides of the rectangular form lie in the widthwise direction of the wiper blade 12G.

The backing unit 40 includes the block member 41 in which block portions 41x are continuously arranged in the longitudinal direction. In the block member 41, the block portions 41x are arranged next to one another in the longitudinal direction. Adjacent block portions 41x may be connected to each other or be independent from each other. Each block portion 41x has a trapezoidal form in a side view (widthwise direction view). In the present embodiment, the long side of the trapezoid is the upper side, and the short side is the lower side. In a structure in which the adjacent block portions 41x are connected to each other, the long sides of the trapezoids are connected to each other. In a structure in which the adjacent block portions 41x independent from each other, the long sides of the trapezoids are in contact with each other. Each block portion 41x is movable relative to the adjacent block portion 41x about the connected part or the contacting part so that the entire block member 41 can be deformed and curved or the like in the vertical direction in a side view (widthwise direction view). That is, the block member 41 is configured to be deformable in the curving direction of the wiper blade 12G and capable of following the curved form of the wiper blade 12G.

The block member 41 includes two insertion holes 41a extending in the longitudinal direction and an insertion hole 41b also extending in the longitudinal direction. The main backings 22 are inserted into and held in the insertion holes 41a. The sub-backing 24 is inserted into and held in the insertion hole 41b. In such an accommodated state, the main backings 22 are arranged in the widthwise direction slightly spaced apart from one another in the widthwise direction. The sub-backing 24 is disposed between the main backings 22 in a central part of the block member 41 in the widthwise direction. The main backings 22 are located in the block portions 41*x* proximate to the long sides of the trapezoids, and the sub-backing 24 is located in the block portions 41*x* proximate to the short sides of the trapezoids.

One end 24*z* of the sub-backing 24 is connected to an end of the block member 41. The other end of the sub-backing 24 is connected by a pressure regulation spring 42 to a backing moving motor BM3 serving as an electric driving device. The backing moving motor BM3 is coupled to, for example, the wiper arm 11 or the wiper blade 12G. The backing moving motor BM3 moves the sub-backing 24 forward and backward in the longitudinal direction to change the longitudinal position of the sub-backing 24. This changes the curved form of the block member 41 and, consequently, the curved form of the wiper blade 12G. In the present embodiment, for example, the backing moving motor BM3 drives and moves the sub-backing 24 backward to change and further curve the form of the block member 41, or the wiper blade 12G, as shown in FIG. 21. Conversely, when the sub-backing 24 is moved forward, the block member 41 returns the wiper blade 12G to its original curved form. In this manner, the wiper blade 12G contacts a wiping surface WS3*a* of a windshield WS3 in a preferred manner. The pressure regulation spring 42 functions to apply an appropriate amount of pressing force to the wiping surface WS3*a* and absorb changes in the form of the wiping surface WS3*a* differing from changes in the form of the wiper blade 12G when the backing moving motor BM3 and the sub-backing 24 are driven.

If the two main backings 22 can be replaced by the sub-backing 24 and the pressure regulation spring 42, the main backings 22 can be omitted.

Figure 22:
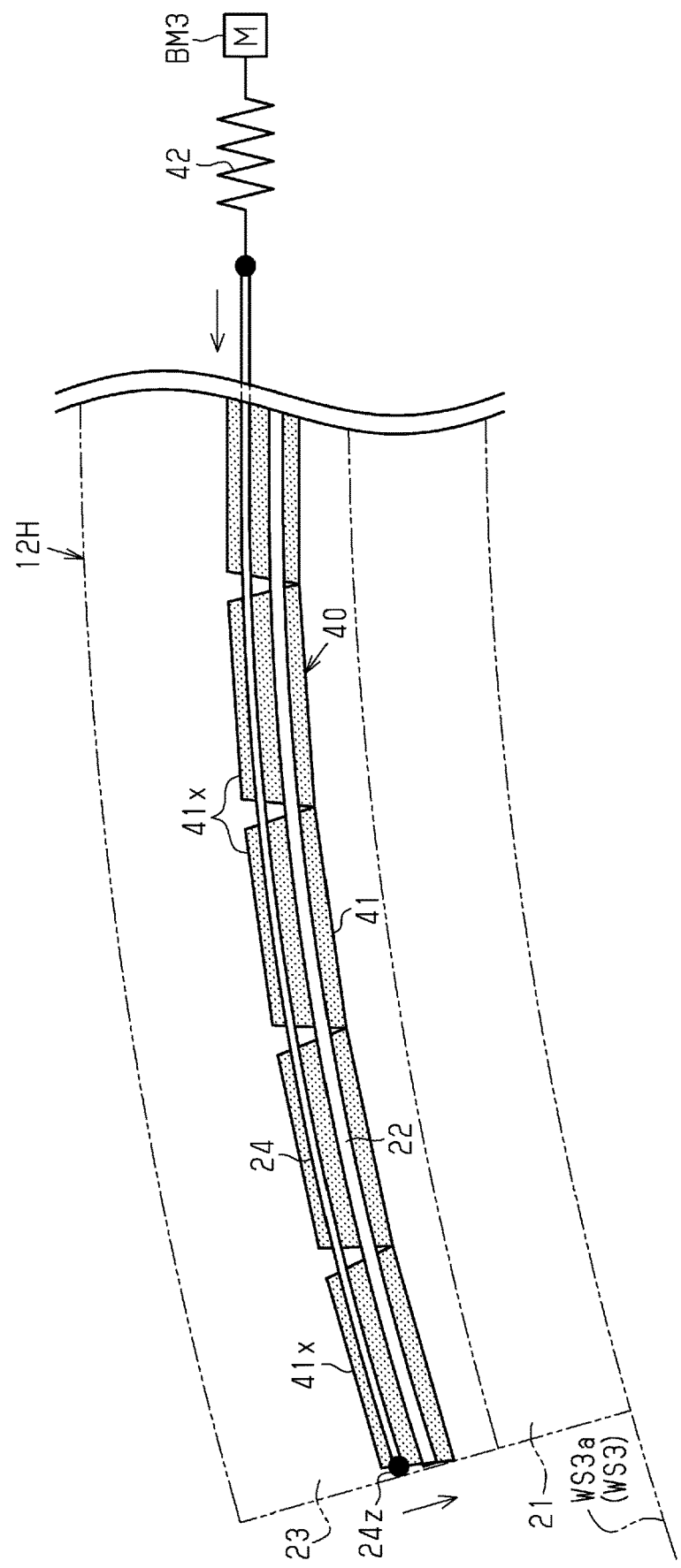
FIG. 22 is a diagram illustrating a wiping mode of the wiper blade in accordance with a further example.

FIG. 22 shows a wiper blade 12H in which the backing unit 40 is accommodated in a state reversed upside down. That is, each block portion 41*x* is disposed so that the long side of the trapezoid is the lower side and the short side of the trapezoid is the upper side in a side view (widthwise direction view). Further, in the present embodiment, the backing moving motor BM3 drives and moves the sub-backing 24 forward to change and further curve the block member 41, or the wiper blade 12H, as shown in FIG. 22. Conversely, when the sub-backing 24 is moved backward, the block member 41 returns the wiper blade 12G to its original form. In this manner, the wiper blade 12H contacts the wiping surface WS3*a* of the windshield WS3 in a preferred manner.

The sub-backing 24 of the first embodiment or the like uses wire spring material having a circular cross section to obtain a curved form changed in accordance with the rotational position. Instead, wire spring material having an oval or elliptic cross section may be used to obtain backing of which rigidity differs in accordance with the rotational position. Thus, the rotational position of a backing formed from non-circular wire spring material may be changed in accordance with the curved form of a wiping surface. Alternatively, the rigidity of a sub-backing can be decreased to increase the effect of the main backings 22 or the rigidity of the sub-backing can be increased to decrease the effect of the main backings 22 in order to increase the capability of a wiper blade for following a curve of a wiping surface.

With regard to the control executed by the control circuit WC, the sub-backing 24 is drive-controlled based on the wiping position of the wiper blade 12 detected by the wiping position detection sensor a1. However, sensors illustrated in the broken lines in FIG. 1 may also be used. The sensors include, for example, a lock back detection sensor a2, a vehicle speed sensor a3, a deposited matter detection sensor a4, a chattering detection sensor a5, and the like.

The lock-back detection sensor a2 detects a lock-back state that refers to a state in which the wiper arm 11 (wiper 10) is held in an upright position (generally orthogonal to wiping surface WS1*a*). The control circuit WC uses the lock-back detection sensor a2 to check for a lock-back state when driving the sub-backing 24.

In detail, when returning from a lock-back state of the wiper arm 11 to a state in which the wiper blade 12 contacts the wiping surface WS1*a*, if the wiper arm 11 is quickly returned, a strong impact may be applied to the wiper blade 12. In such a case, if the sub-backing 24 of the wiper blade 12 is arranged at the second rotational position r12 and set to be generally horizontal, the impact from the wiping surface WS1*a* can be effectively dispersed in the longitudinal direction of the wiper blade 12. If the sub-backing 24 is arranged at the first rotational position r11 and set so that the distal end portion of the sub-backing 24 is directed toward the lower side (wiping surface WS1*a*), the impact may be concentrated at the distal end portion of the wiper blade 12. Thus, when the lock-back detection sensor a2 detects that the wiper arm 11 is in a lock-back state, the control circuit WC can move the sub-backing 24 to the second rotational position r12 and prepare in advance for the impact that will be applied to the wiper blade 12 when returned to its original position.

The control circuit WC uses the vehicle speed sensor a3 to check the vehicle speed when driving the sub-backing 24.

In detail, the wiper blade 12 receives the effect of the wind produced when traveling and changed in accordance with the vehicle speed. Thus, the control circuit WC can adjust the rotational position of the sub-backing 24 also using a middle rotational position between the first and second rotational positions r11 and r12 based on the vehicle speed detected by the vehicle speed sensor a3 so that the wiper blade 12 remains pressed against the wiping surface WS1*a* and does not rise.

The deposited matter detection sensor a4 is a rain sensor (sensor using light-emitting-receiving element), an onboard camera, or the like. The control circuit WC uses the deposited matter detection sensor a4 to check the type of deposited matter on the wiping surface WS1*a* or whether matter is deposited on the wiping surface WS1*a* when driving the sub-backing 24.

In detail, the form of the wiper blade 12 can be changed to adjust the pressing force applied to the wiping surface WS1*a* in accordance with the type of deposited matter on the wiping surface WS1*a* or whether matter is deposited on the wiping surface WS1*a*. This will improve the wiping performance of the wiper blade 12. Thus, the control circuit WC can adjust the rotational position of the sub-backing 24 also using a middle rotational position between the first and second rotational positions r11 and r12 based on the type or presence of deposited matter on the wiping surface WS1*a*, which is detected with the deposited matter detection sensor a4, to change the form of the wiper blade 12 and adjust the pressing force applied to the wiping surface WS1*a*.

The chattering detection sensor a5 is an acceleration sensor or the like arranged on the wiper blade 12, and the control circuit WC checks chattering (consecutive skipping) of the wiper blade 12, which wipes the wiping surface WS1*a*, when driving the sub-backing 24.

In detail, the form of the wiper blade 12 can be changed to adjust the pressing force applied to the wiping surface WS1*a* in accordance with the occurrence of chattering of the wiper blade 12, which wipes the wiping surface WS1*a*. This will improve the wiping performance of the wiper blade 12 and reduce noise. Thus, the control circuit WC can adjust the rotational position of the sub-backing 24 also using a middle rotational position between the first and second rotational positions r11 and r12 based on the occurrence of chattering of the wiper blade 12, which is detected by the chattering detection sensor a5, to change the form of the wiper blade 12 and adjust the pressing force applied to the wiping surface WS1a.

In the first and second embodiments, the backing moving motors BM, BM1, BM2, and BM3 are coupled to the wiper blade 12 but may be coupled to other parts such as the wiper arm 11.

The backing moving motors BM, BM1, BM2, and BM3 can be replaced by electric driving devices other than motors. Further, a portion of the drive force of the wiper motor WM can be used to drive a sub-backing. Moreover, a sub-backing may be mechanically driven in cooperation with the action of the wiper arm 11 or the like.

In the wiper blades 12, 12A, and 12B, if the sub-backings 24, 24A, 24B, and 24C serve as state changing members that can change the state (curved form and rigidity described above) of the wiper blades 12, 12A, and 12B, and the sub-backings 24, 24A, 24B, 24C have the functions of the main backings 22, the main backings 22 can be omitted so that only the sub-backings 24, 24A, 24B, and 24C are used.

The structures of the wiper blades 12, 12A, 12B, and the like and the vehicle wiper device WD may be changed.

A technical concept that can be recognized from the above embodiments and modified examples will now be described.

(A) A wiping blade that wipes a wiping surface (WS1a, WS2a), the wiping blade comprising:

a blade rubber (21) that is disposed in contact with the wiping surface, a wiper case (23) that holds the blade rubber, and a state changing member (24, 24A to 24D) that is accommodated in the wiper case and rotatable in the wiper case, wherein the state changing member is configured to change a curved form or rigidity in a longitudinal direction of the wiper blade in accordance with a curved form of the wiping surface by changing a rotational position (r11, r12, ra21, ra22, rb21, rb22, r31, r32) of the state changing member.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle wiper device comprising:
    a wiping blade that wipes a wiping surface, the wiping blade comprising:
        a blade rubber that is disposed in contact with the wiping surface;
        a first backing that is formed from leaf spring material and applies pressing force directed toward the wiping surface to the blade rubber;
        a wiper case that holds the blade rubber;
        a state changing member, which is a second backing accommodated in the wiper case next to the first backing so as to be rotatable in the wiper case or movable in a longitudinal direction, the state changing member being configured to change a curved form or a rigidity in the longitudinal direction of the wiper blade in accordance with a curved form of the wiping surface when a rotational position or a longitudinal position of the state changing member is changed; and
        an electric driving device configured to change the rotational position or the longitudinal position of the state changing member;
    a wiper arm including a distal end portion to which the wiper blade is attached;
    a wiper motor that pivots the wiper arm back and forth so that the wiper blade produces a wiping action;
    a control circuit that controls and drives the wiper motor and the electric driving device; and
    a wiping position detection sensor that detects a wiping position of the wiper blade,
    wherein the control circuit is configured to change a rotational position of the second backing with the electric driving device during the wiping action and in accordance with the wiping position of the wiper blade.

2. The vehicle wiper device according to claim 1, wherein
    the wiper case that holds the blade rubber also accommodates the first backing next to the blade rubber,
    the second backing is rotatable in the wiper case, and
    the second backing is configured to change the curved form or the rigidity in the longitudinal direction of the wiper blade in accordance with the curved form of the wiping surface when the rotational position of the second backing is changed.

3. The vehicle wiper device according to claim 2, wherein
    the second backing is one of a plurality of second backings, and
    the second backings are configured so that the rotational position of each of the second backings is changed independently.

4. The vehicle wiper device according to claim 2, wherein
    the first backing is one of at least two first backings, and
    the second backing is disposed between the two first backings in a widthwise direction.

5. The vehicle wiper device according to claim 2, further comprising an auxiliary member disposed between the second backing and the wiper case.

6. The vehicle wiper device according to claim 2, further comprising a coating that covers an outer surface of the second backing.

7. The vehicle wiper device according to claim 2, wherein the first and second backings are accommodated in the wiper case as a backing unit of a sub-assembly.

8. The vehicle wiper device according to claim 7, wherein
    the backing unit includes a block member that is deformable in a curving direction of the wiper blade,
    the block member includes block portions continuously arranged in the longitudinal direction,
    adjacent ones of the block portions are movable in at least the curving direction of the wiper blade, and
    the first and second backings are each inserted through and held in the block member.

9. The vehicle wiper device according to claim 1, wherein the electric driving device is disposed in a portion of the wiper blade covered by the wiper arm.

10. The vehicle wiper device according to claim 1, further comprising a lock-back detection sensor that detects lock-back of the wiper arm, wherein the control circuit changes the rotational position of the second backing when the wiper arm is in a lock-back state.

11. The vehicle wiper device according to claim 1, further comprising a vehicle speed sensor that detects a vehicle speed of a vehicle provided with the vehicle wiper device, wherein the control circuit changes the rotational position of the second backing in accordance with the vehicle speed.

12. The vehicle wiper device according to claim 1, further comprising a deposited matter detection sensor that detects deposited matter on the wiping surface, wherein the control circuit changes the rotational position of the second backing in accordance with type or presence of the deposited matter.

13. The vehicle wiper device according to claim 1, further comprising a chattering detection sensor that detects chattering of the wiper blade, wherein the control circuit changes the rotational position of the second backing in accordance with occurrence of the chattering of the wiper blade.

* * * * *